(12) United States Patent
Soodammani

(10) Patent No.: US 12,214,483 B2
(45) Date of Patent: Feb. 4, 2025

(54) CRICKET GAME INTELLIGENT BOT UMPIRE FOR AUTOMATED UMPIRING AND SCORING DECISIONS DURING CRICKET MATCH

(71) Applicant: Cricketronics Private Limited, Chennai (IN)

(72) Inventor: Nagarajan Soodammani, Chennai (IN)

(73) Assignee: Cricketronics Private Limited (IN)

( * ) Notice: Subject to any disclaimer, the term of this patent is extended or adjusted under 35 U.S.C. 154(b) by 145 days.

(21) Appl. No.: 17/786,036

(22) PCT Filed: Dec. 15, 2020

(86) PCT No.: PCT/IN2020/051029
§ 371 (c)(1),
(2) Date: Jun. 16, 2022

(87) PCT Pub. No.: WO2021/124351
PCT Pub. Date: Jun. 24, 2021

(65) Prior Publication Data
US 2023/0050335 A1    Feb. 16, 2023

(30) Foreign Application Priority Data
Dec. 16, 2019 (IN) ................. 21941052041

(51) Int. Cl.
*B25J 11/00* (2006.01)
*A63B 71/06* (2006.01)
(Continued)

(52) U.S. Cl.
CPC .......... *B25J 11/00* (2013.01); *A63B 71/0605* (2013.01); *A63B 71/0669* (2013.01);
(Continued)

(58) Field of Classification Search
CPC ........ A63B 2225/093; A63B 2220/807; A63B 2220/05; A63B 69/0015; A63B 71/0669;
(Continued)

(56) References Cited

U.S. PATENT DOCUMENTS 12,100,210 B2 * 9/2024 Gurpinar-Morgan ....................... G06N 3/084
2013/0184039 A1 * 7/2013 Steir ..................... A63F 13/828 463/1

(Continued)

FOREIGN PATENT DOCUMENTS

| AU | 2015372431 A1 | 7/2017 |
| EP | 3299070 A1 | 3/2018 |
| WO | 2016101021 A1 | 6/2016 |

OTHER PUBLICATIONS

International Search Report and Written Opinion of the International Searching Authority Patent Application No. PCT/IN2020/051029 mailed Mar. 19, 2021, Indian Property Office.

(Continued)

Primary Examiner — Malina D. Blaise
(74) Attorney, Agent, or Firm — Spencer Fane, LLP

(57) ABSTRACT

The present disclosure is directed to a non-intrusive, integrated system comprising an umpire bot for automatically monitoring, umpiring, scoring, analytics, learning and coaching for players while eliminating need for human umpires and scorers. The automated umpire bot with intelligent telescopic function monitors, cognitively recognizes and captures movements from all equipment's, analyses them, moves up and down and even avoid ball collision travelling towards it. The non-intrusive real time system captures all the game moments right from players initiation, toss of coin, commencement of game, monitoring field positions, keeping scores, umpiring decisions, overs, valid/in-valid deliveries, validating balls per over, wickets, (Continued)

catches, boundaries, sixes and displaying scores and statistics all throughout the game.

8 Claims, 27 Drawing Sheets

(51) Int. Cl.
    *G06V 10/774*     (2022.01)
    *G06V 20/10*     (2022.01)
    *G06V 40/20*     (2022.01)
    *A63B 69/00*     (2006.01)

(52) U.S. Cl.
    CPC ........... B25J 11/003 (2013.01); *G06V 10/774* (2022.01); *G06V 20/10* (2022.01); *G06V 40/23* (2022.01); *A63B 69/0015* (2013.01); *A63B 2220/05* (2013.01); *A63B 2220/807* (2013.01); *A63B 2225/093* (2013.01)

(58) Field of Classification Search
    CPC ..... A63B 71/0605; B25J 11/003; B25J 11/00; G06V 10/774; G06V 40/23; G06V 20/10
    See application file for complete search history.

(56) References Cited

U.S. PATENT DOCUMENTS

| | | | | |
|---|---|---|---|---|
| 2016/0354664 A1* | 12/2016 | DeCarlo | ................... | F41J 5/02 |
| 2017/0157482 A1* | 6/2017 | DeCarlo | .............. | A63B 63/083 |
| 2018/0140926 A1 | 5/2018 | Minkovitch | | |
| 2018/0326284 A1* | 11/2018 | Mariappan | ............. | A63B 60/46 |
| 2019/0091535 A1* | 3/2019 | DeCarlo | .............. | A63B 69/002 |
| 2020/0128902 A1* | 4/2020 | Brown | ...................... | A42B 3/30 |
| 2020/0387817 A1* | 12/2020 | Kurtz | ..................... | G06V 20/40 |
| 2021/0125349 A1* | 4/2021 | Song | ......................... | G01S 5/16 |
| 2023/0009354 A1* | 1/2023 | DeCarlo | .............. | A63B 69/002 |
| 2023/0119793 A1* | 4/2023 | Joseph | ............... | A63B 24/0021 473/447 |
| 2023/0218971 A1* | 7/2023 | Hall | .......................... | G06T 7/75 700/91 |
| 2023/0410507 A1* | 12/2023 | Hall | ...................... | G06V 10/25 |

OTHER PUBLICATIONS

Patents Act 1977: Examination Report under Section 18(3) Patent Application No. GB2210502.7 mailed Jul. 27, 2023, Intellectual Property Office.

Patents Act 1977: Examination Report under Section 18(3) Patent Application No. GB2210502.7 mailed Oct. 11, 2023, Intellectual Property Office.

P. O'hagan, Response to the Examination Report under Section 18(3) mailed on Sep. 27, 2023 UK Patent Application GB2210502.7, Lincoln IP.

P. O'hagan, Response to the Examination Report under Section 18(3) mailed on Feb. 19, 2024 UK Patent Application GB2210502.7, Lincoln IP.

* cited by examiner

○ (1) Fully extended master umpire bot behind the bowler's end stump

▌(2) Fully extended slave umpire bot to square leg side of the striker's end stump ○ (3) Fully retracted master umpire bot
○ (4) Fully retracted slave umpire bot

- ♀ (1) Fully extended master umpire bot behind the bowler's end stump
- ▮ (2) Fully extended slave umpire bot to square leg side of the striker's end stump
- ○ (3) Fully retracted master umpire bot
- ○ (4) Fully retracted slave umpire bot
- ○ (5) Fully retracted slave umpire bot
- ○ (6) Fully retracted slave umpire bot

CRICKET GAME INTELLIGENT BOT UMPIRE FOR AUTOMATED UMPIRING AND SCORING DECISIONS DURING CRICKET MATCH

FIELD OF INVENTION

The subject matter described herein, in general, relates to an automated cricket umpiring and decision making, and more particularly relates to a bot umpire for automated cricket umpiring, scoring, performing game analytics, and enabling learning & coaching during a cricket match.

BACKGROUND OF INVENTION

Conventional cricket umpiring requires change in position of umpires at bowler end or striker end at completion of each over to mark the change in bowling. Though there have been solutions that use camera to predict certain decisions in sports using high end cameras, these cameras are placed outside the play area. Moreover, the umpires who are responsible for closely scrutinizing each detail of the match during play, makes them tiresome and even prone to human errors. Further, there is always a chance to collide with a hard-hit ball, which might be even hitting the umpire and may decide fate of any game.

Furthermore, the umpires are required to change their positions from bowler's end to striker's end and vice versa after end of each over, making it all the more mundane and burdensome. Thus, in the background of foregoing limitations there exists a need of a system that economically automates the scoring and decision-making during cricket match based on detailed and logical analysis of match played in real time like that of humans, but still not umpired in same fashion. In furtherance to correct cricketing, the assessment of match played by the team can help improvise their game based on critical analysis of each ball played, errors made, and strategy adopted. Also, the intervention by human umpires and even their likelihood of being hit requires that it is replaced by an automated system.

OBJECT OF THE INVENTION

The primary object of the present disclosure is to provide a unified, non-intrusive integrated bot system for automatically monitoring, umpiring, scoring, analytics, learning and coaching for players and participants without human umpires and scorers.

Another object of this disclosure is to provide a cost-effective, easily configurable and automated bot umpiring system for monitoring, cognitively recognizing and capturing movements from cricket equipment and players for effective cricket umpiring and decision making.

Yet another object of the disclosure is to provide an easily operable cricket umpiring bot for analyzing cricket scores and delivering umpiring decisions.

Yet other object of the present disclosure is to aid the players and teams in setting up the pitch, creases, placement of stumps, tossing of coins, identification of player using statistics, and setting rip or defining of boundaries to enable accurate and precise umpiring via a at least two pair of bot umpires.

In yet another embodiment, the disclosure provides a simple, albeit a non-intrusive real time system that captures all the game moments, right from players initiation, tossing of coin, commencement of game, monitoring field positions, keeping track of scores, umpiring decisions, overs, valid/invalid deliveries, validating balls per over, wickets, catches, boundaries, sixes and displaying scores and statistics all throughout the game.

In still other embodiment of present disclosure, the system provides for visible/verbal readable display panel, which interacts and provides real-time scoring, umpiring decisions across day and night conditions.

One other embodiment of present disclosure provides for a system that assists in learning and coaching the players individually and collectively for the players/participants in order to improvise their game play.

In one of the significant embodiments of present disclosure, the system is designed to withstand wear and tear needs of the game and is suitable for use across all weather conditions.

In still other exemplary embodiments of present disclosure, the system stores and provides real-time game statistics for players/participants/team standing across different geographies.

In yet another embodiment, the system is capable of coaching in local languages and dialects that assist in easy umpiring, scoring and coaching during cricket matches.

In still other embodiment, the system is capable of interacting and communicating with other players and audience in play area to give real time updates, flashing scores, display umpire review system, statistics and commentary.

These and other objects will become apparent from the ensuing description of the present invention.

SUMMARY OF THE INVENTION

The present invention is directed to a cricket umpiring system (100), comprising at least a pair of umpire bots provided at bowler's end (50 a, 50 d) and at least a pair of umpire bots provided at striker's end (50 b, 50 c), wherein, during a first over of play, umpire bot (50 a) placed at the bowler's end is configured as a master and configured to make umpiring and scoring decisions and an umpire bot (50 d) placed at the bowler's end and the pair of umpire bots (50 b, 50 c) placed at the striker's end are configured as slaves; and wherein, during the first over of play, umpire bots (50 a, 50 b) placed at the bowler's end and the striker's end, respectively, are configured to be fully extended via the telescopic functionality; and umpire bots (50 d, 50 c) placed at the bowler's end and the striker's end, respectively, are configured to be fully retracted into a play area. The cricket umpiring system further comprises of an artificial intelligence (AI) module (115) that trains the system (100), perform analysis based on player profile, assess contextual information, and facilitates real time decision making during playtime based on the analysis of player profile and the assessment of contextual information. Furthermore, the system comprises of a display interface 70 that is configured to display the decision and perform autoscoring of the game.

In other significant aspect of disclosure, the pair of umpire bots (50 a, 50 d) are provided behind bowler's end stumps and square leg side of bowler's end stumps, respectively and the pair of umpire bots (50 b, 50 c) are provided on square legs side of striker's end stump and behind the striker's end stump, respectively.

In another significant aspect of disclosure, the umpire bots (50 a, 50 c) placed at the bowler's end stumps and the striker's end stumps, respectively, alternate from master to slave roles while the umpire bots (50 b, 50 d) placed at the striker's end and at the bowler's end, respectively, continue to assume slave roles throughout the game; and an assigned master umpire bot at the bowler's end and a corresponding slave umpire bot at the striker's end are configured to be fully extended, while remaining slave umpire bots' are configured to be fully retracted.

These and other aspects, features and advantages of the present invention will be described or become apparent from the following detailed description of preferred embodiments.

BRIEF DESCRIPTION OF THE DRAWINGS

FIG. 4(*a*) illustrates position of umpire bot system in cricket play area, in accordance with one preferred embodiment of present disclosure.

FIG. 5(*a*) is an illustration of top view of the umpire bot system, in accordance with one preferred embodiment of present disclosure.

FIG. 8 shows an automatic umpiring decision for run out, in accordance with one preferred embodiment of present disclosure.

DETAILED DESCRIPTION OF THE EMBODIMENTS

Figure 1:
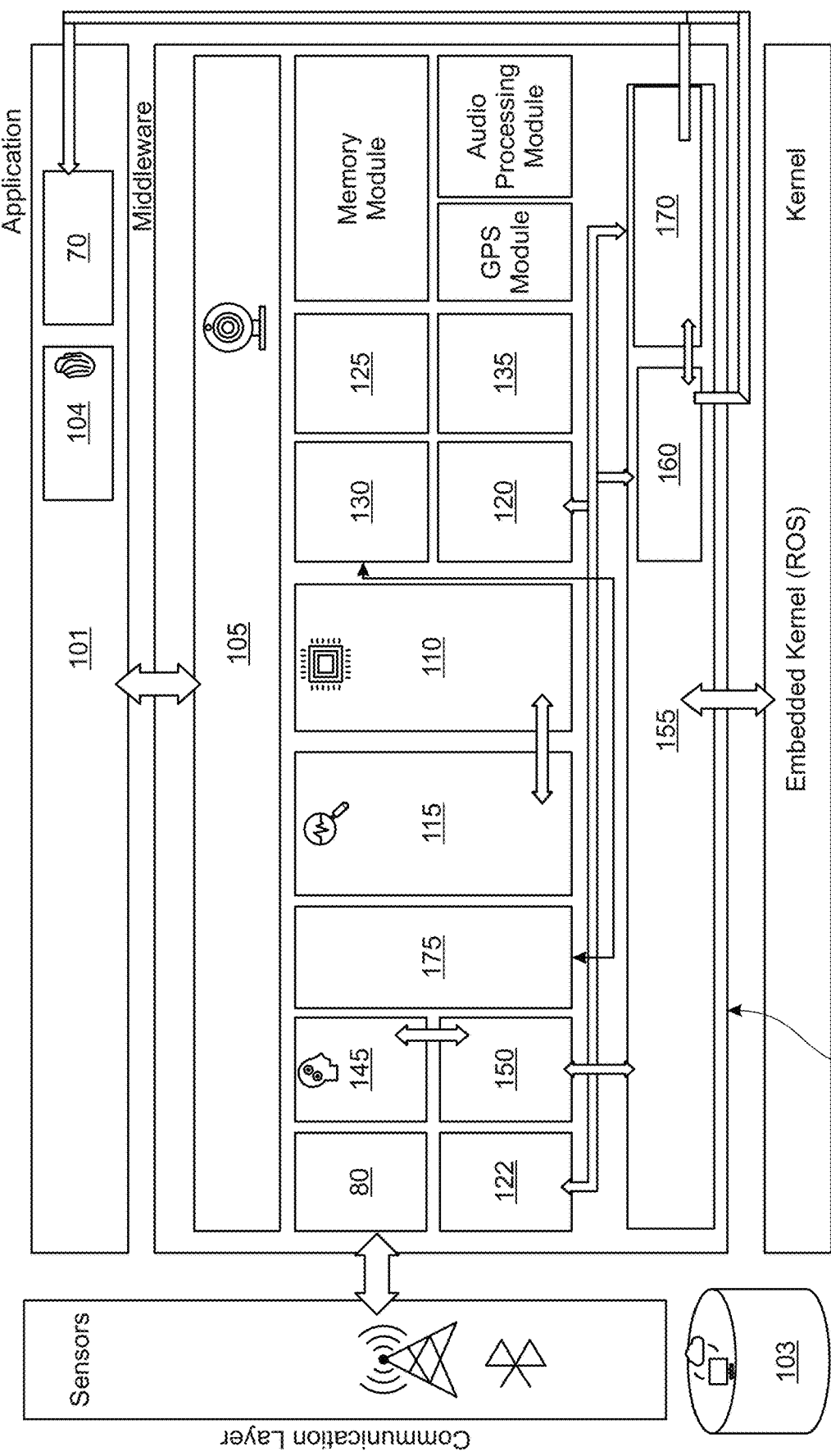
FIG. 1 depicts a block diagram of cricket umpiring system, in accordance with one preferred embodiment of present disclosure.

Before the present mechanism of automating cricket umpiring and scoring bot, umpire is described, it is to be understood that this disclosure is not limited to the particular apparatus or system, as described, since it may vary within the specification indicated. It is also to be understood that the terminology used in the description is for describing the particular versions or embodiments only and is not intended to limit the scope of the present invention, which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary methods of the invention, which may be embodied in various forms.

Broadly, the present disclosure provides for a unified, non-intrusive integrated bot system for automatically monitoring, umpiring, scoring, analytics, learning and coaching for players/participants. The automated umpire bot is capable of monitoring, cognitively recognizing and capturing movements from all cricket equipment (bat, ball, helmet, gloves, pads, clothing, etc.), analyzing the players/participants (including their commentaries), keeping scores and delivering umpiring decisions via intelligent telescopic function. Accordingly, at least two bots are positioned at legside and two at ends of cricket pitch. The intelligent telescopic feature of umpire bot enables the umpire bot at bowler end and umpire bot at striker end to be fully extended likewise the other bowler end umpire bot and striker end umpire bot fully retracted to the ground.

The system aids the players/teams in setting up the pitch, creases, placement of stumps, toss of coin, identification of players with statistics, setting up and defining boundaries. The non-intrusive real time system captures all the game moments, right from players initiation, tossing of coin, commencement of game, monitoring field positions, keeping scores, umpiring decisions, overs, valid/in-valid deliveries, validating balls per over, wickets, catches, boundaries, sixes and displaying scores and statistics all throughout the game.

In other exemplary embodiment, the system has integrated batting and bowling coaching and coaching program for players/participants which help them improvise and better their game play. The system communicates with each other, all equipment, players/participants through wired and/or wireless technology and has visible/verbal readable display panel, which interacts and provides real-time scoring, umpiring decisions across day and night conditions.

In one other exemplary embodiment, the system is designed to withstand wear and tear needs of the game and can be used across all weather conditions. The system stores and provides real-time game statistics for players/participants/teams standing, rank etc. cutting across geographies. Preferably, the system can coach in local languages. Further, the system is capable of interacting with Wi-Fi interface connected with electronic camera unit and will transfer data to cloud for future purpose.

Furthermore, the system interacts and communicates with other unique or similar systems and can conduct large number of games offering the above said features. The system is equipped with inbuilt battery charge, which is charged using conventional adapters, the system also has inbuilt solar panel to use solar energy in addition to battery charge.

In general, the system 100 is provided with an umpire bot 50 (a) at bowler's end, defined here as master. On the other hand, an umpire bot 50 (b) are provided at striker's end and defined here as slave. Only the master umpire bot 50 (a) placed at the bowlers' end provides the decision. At any given point in the game there is one master system (at bowler's end) and three slave systems.

When the over ends, the 'umpire bots', collectively referred by numeral 50, work intelligently with 'telescopic functionality' and exchange roles, the respective umpire bots 50 automatically retracts into the ground without obstructing the field. Even when the umpire bats 50 retract into the ground, they capture the game from their respective positions. Meanwhile the other two umpire bots automatically extend and function as the master umpire bot at the bowlers' end and slave umpire bot at the striker end. In one working embodiment, all the four umpire bots continuously monitor and track all the game moments throughout and interact seamless with each other.

In one significant embodiment, the integrated software module provides integrated software for cognitive, real-time capturing, monitoring, keeping score, umpiring decisions, learning and coaching the players. The software module links up to cloud servers to update/upload/download real time-audio/video feeds from the game.

Referring now to FIG. 1, a block diagram illustrating an automated system 100 for cricket game analytics, monitoring, umpiring, scoring, learning and coaching, is provided. As can be seen in FIG. 1, the system 100 broadly comprises of an elaborate network of modules such as an image detection module 105, a machine learning (ML) module 110, an artificial intelligence (AI) module 115, a speech module 120, a rewarding module 125, an analytics module 130, a training module 135, a location detection module 140, a user profile module 145, a game context module 150, a game logic 155, an automatic scoring module 160, an automatic umpiring module 170, and a learning and coaching module 175. Each of these modules will now be discussed in detail in subsequent paragraphs.

To begin with, an image detection module 105 is used to classify image capturing device 101, say for example, camera frames in real-time, displaying the best match result as an overlay on the captured camera image. This gets stored in a database 103 for future use. This module 105 may be invoked by an "Admin module" 104 from application, which runs at real time to capture images or objects.

Next, the ML module 110 uses the images (data set stored in database 103) captured by image detection module 105 to train by itself with the images or other image related data captured during each cricket game. Now, the AI module 115 reads the real time images that come from camera feed and matches with the already trained data set. Usually, such data is captured via a face detection technique that identifies the person visible in the frame, and similarly detects line, human pose and ball during the game. These elements form integral part of AI module 115 to intelligently perform umpiring and scoring decisions later.

Now, the speech conversion module 120 runs a simple speech recognition model built by the audio training tutorial 122. The module 120 throughout the game listens to conversation between the players in the ground and identifies abusive language and initiates necessary action as per cricketing rules, this enables fair play and prevents 'sledging' in order maintain the spirit of the game. In one exemplary embodiment of present disclosure, the rewarding module 125 is invoked from display interface 70, where the user is asked to scan (QR code) any of the product. Based on the product configuration rewards points or coupon is shared with user. This rewards points/coupon can be used to purchase any of the configured products. The product is displayed in the interface 70, the user can select, and they can redeem it either in the company branded outlet/through online.

In one other embodiment, the analytics module 130 is used to store the player/user behavior, their interest, interaction, etc. that gets stored for future use. This information is used by training module 135 to enhance the system 100 based on user's interest. The training module 135 helps the user to understand their game. The stored data is used for analysis, and this data will help the user to correct their mistakes. Now the location detection module 140 is used to identify the location of ground. Thus, based on location pre-set data can be populated and it can be used by user.

In one exemplary embodiment, the user profile module 145 is used to capture the user's information for every game and record their specialization, strength, weakness, shot selection, foot work, body gestures etc. Next, the game context module 150 is used to setup certain system parameters like lighting, weather condition, ground setup etc. based on the context. Using contextual information inside recommendation systems is an effective approach to generate more accurate recommendation.

In one other embodiment, the game logic 155 is used to share the result with automatic scoring module 160 and automatic umpiring decision module 170. Here, the umpire decision module 170 takes input from the game logic 155 and provide the umpiring decision as output, which again is provided as an input to the display interface 70. Next, the automatic umpiring module 170 receives input from the automatic scoring module 160 and AI module 115 and performs auto scoring of the game.

Figure 2:
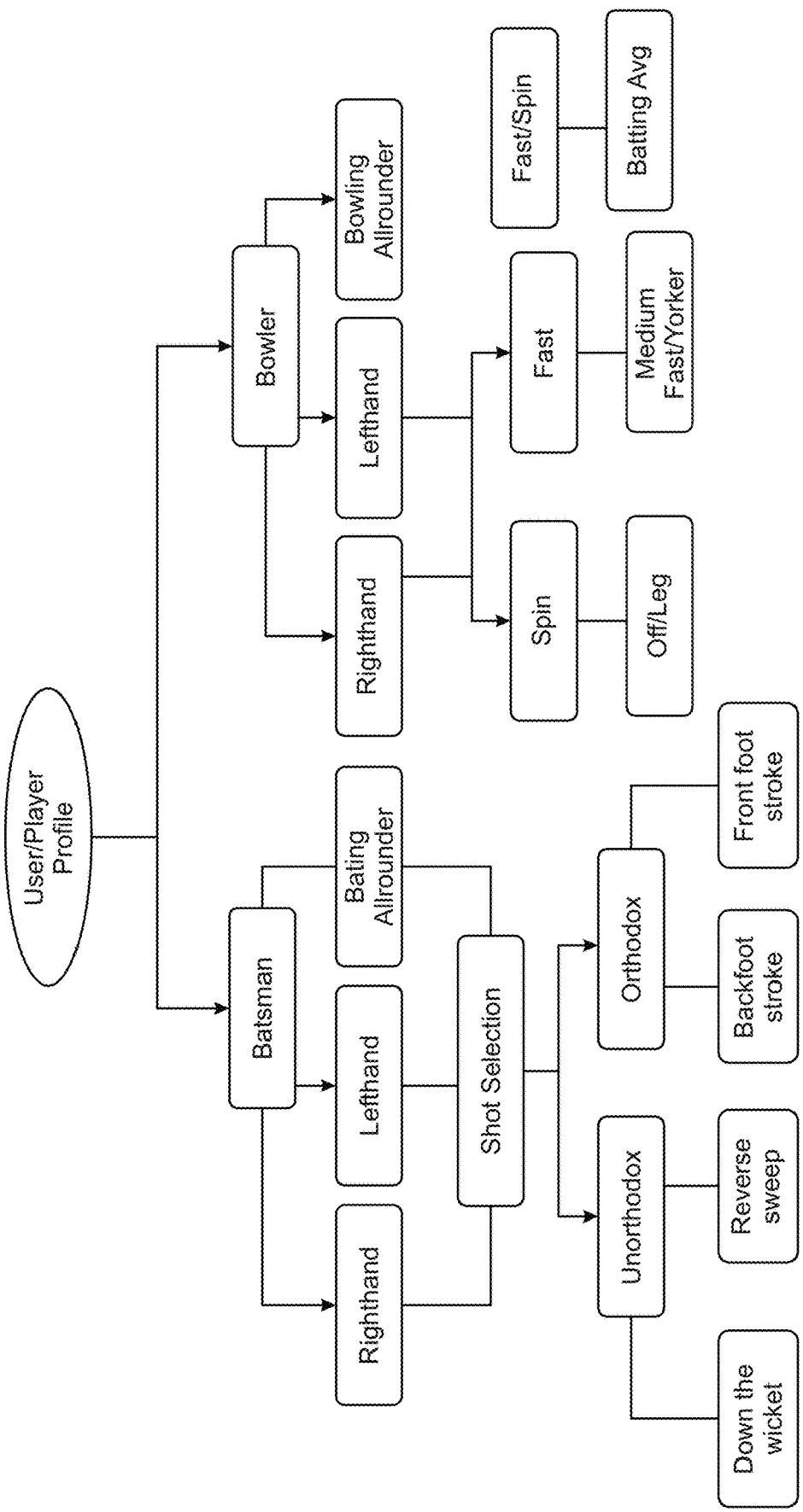
FIG. 2 is an illustration of user or player profile, in accordance with one preferred embodiment of present disclosure.

Referring to FIG. 2, user profile is explained using user profile module 145. Here, the AI module 115 intelligently gathers the users/players information and store it in the database 103. The information that is gathered by the system 100 assists in everyday learning during the game. This information gets stored against each player in database 103 as a user profile. It also recommends the user based on their previous records and give them the suggestion to choose right direction towards the cricket game. FIG. 2 displays the user profile/player profile information that is gathered, though not limited to typical profile of a batsman or a bowler.

Figure 3:
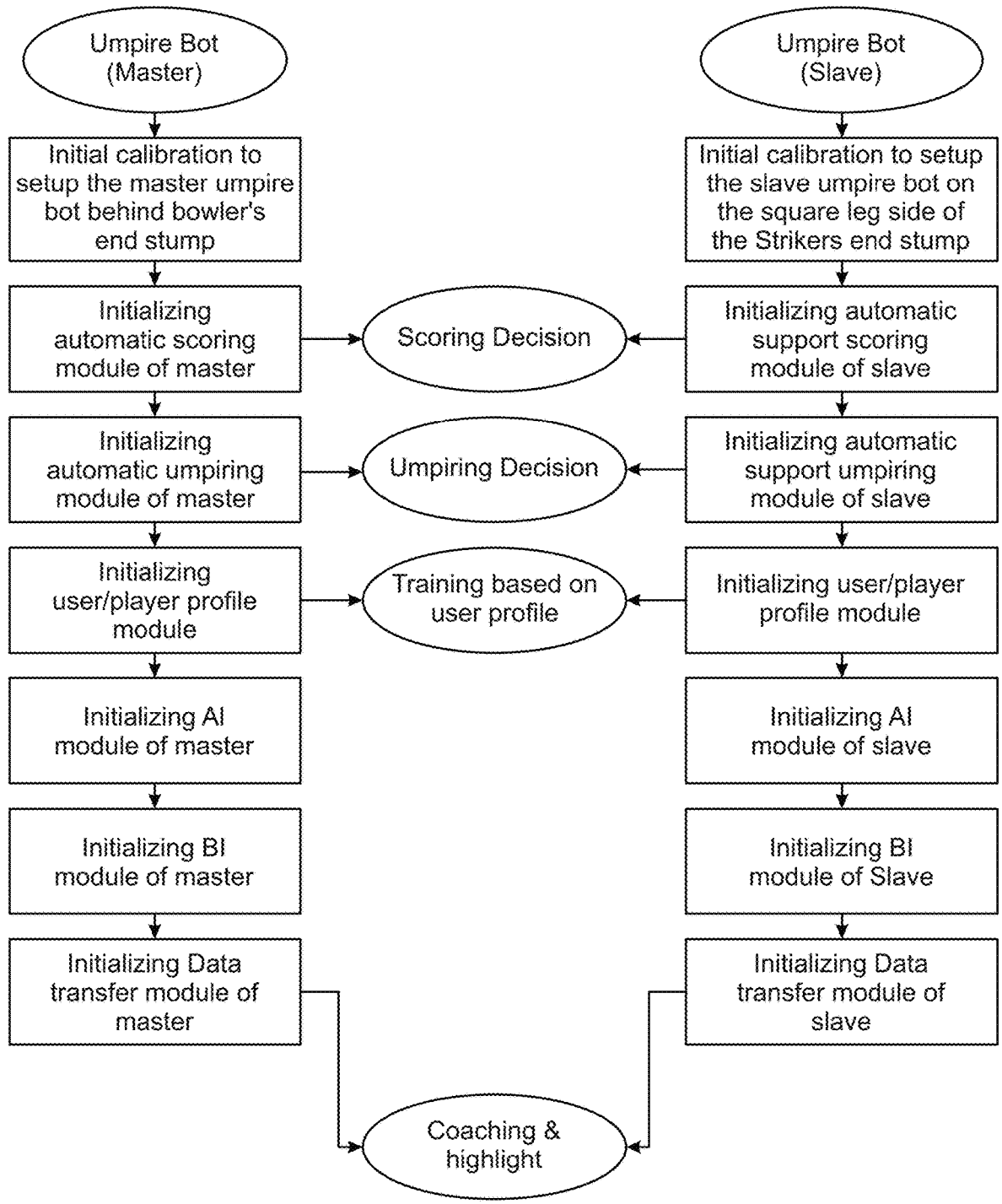
FIG. 3 is an initial calibration process, in accordance with one preferred embodiment of present disclosure.

Next, the calibration flow is explained in FIG. 3. Before start of a game, master and slave umpire bots 50(*a*) and 50(*b*) calibrate each other. This is required for setting umpire bots 50, e.g. behind the stumps and at square legs to the stumps at right place make both the system ready to capture the live match. FIG. 3 refers to set of calibration process that happens between master and slave placed at both the bower and batsman end.

To begin with, initial calibration to setup the master umpire bot (50*a*) behind the bowler's end stump and the slave umpire bot (50*b*) on the square leg side of the striker end is initiated. This is followed by initializing automatic scoring module 160 at both master and slave end. Next, the automatic umpiring module 170 of master and slave is initialized. Then, the user or player profile module 145 is initialized. Now, the AI module 115 at both master and slave end is initialized, followed by initializing of BI module as well. Finally, the data transfer module at both master and slave end is initialized.

As per official rules, at the start of game, the bowling team captain decides which end of the ground the bowler (say example pavilion end and opposite pavilion end) will start bowling the over. Basis the first over, bowling end umpire bot 50(*a*) is assigned as a master, which is then fully extended with its corresponding slave umpire bot 50(*b*) at the strikers' end. Another umpire bot, designated as 50(*c*), which is also master umpire bot by design and functionality will be enabled as slave umpire bot as the umpire bot 50(*a*) is already assigned as master umpire bot for the first over. The slave umpire bot 50(*d*) are assigned as slaves. Umpire bots 50(*c*) and 50(*d*) remain in fully retracted position for the first over bowled, configuration being shown in FIG. 4.

Figure 4:
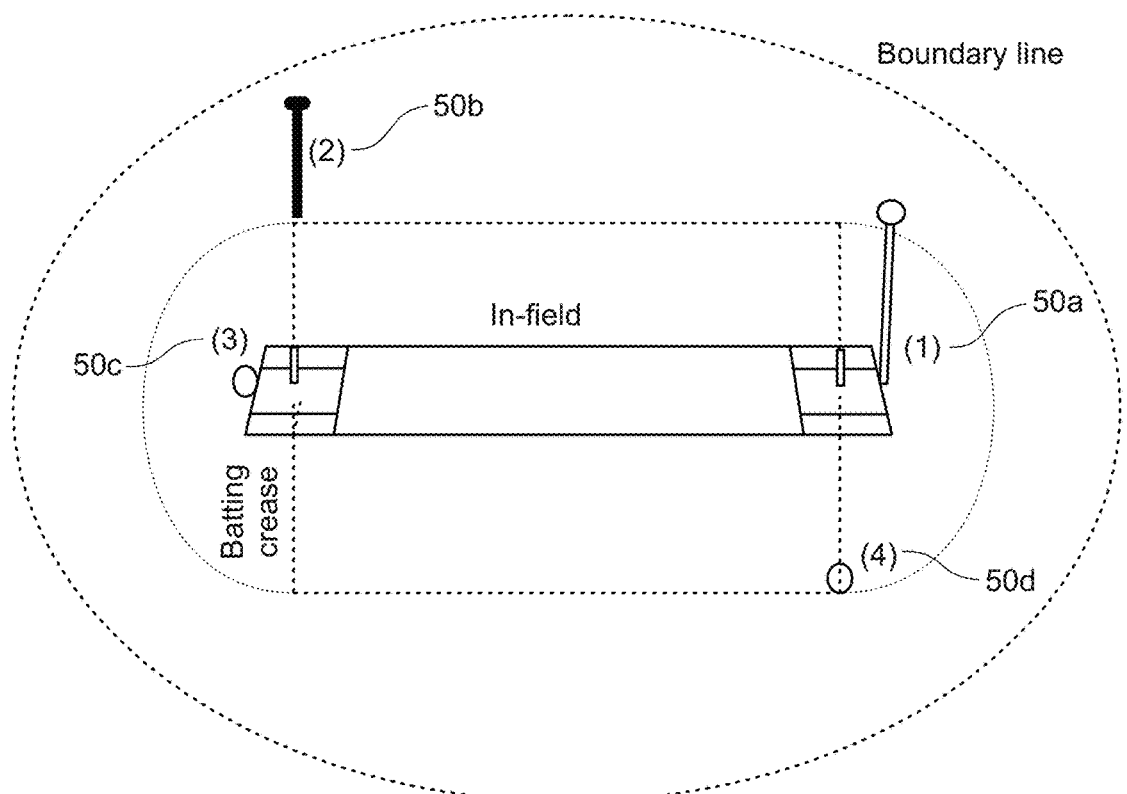
FIG. 4 illustrates position of umpire bot system in cricket play area, in accordance with one preferred embodiment of present disclosure.
Figure 4A:
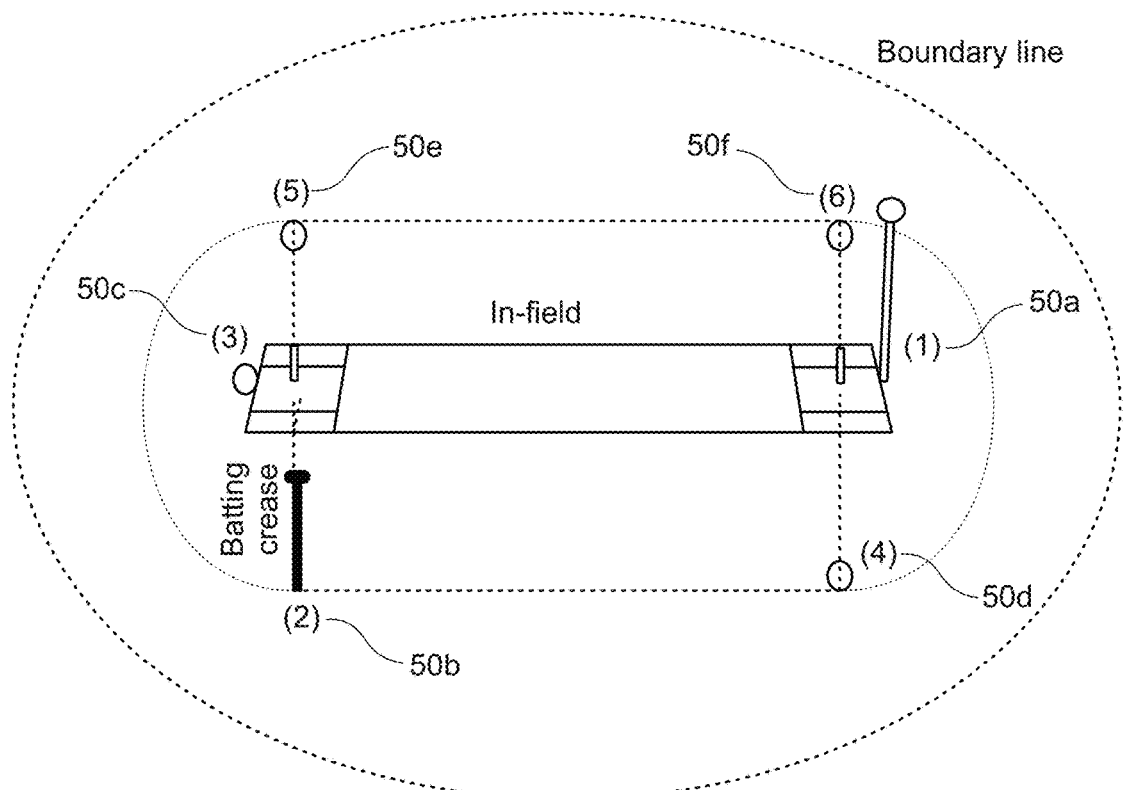

In one of exemplary embodiment as shown in FIG. 4(*a*), for a left handed batsman the slave umpire bot 50(*e*) and 50 (*f*) is placed at strikers end. This position allows the umpire bot to be always at the square leg side of the batsman/striker irrespective of whether the batsman is right or left handed. For a left-handed batsman 50(*a*) and 50(*e*) will be in fully extended position whereas all the remaining four umpire bots 50(*b*), 50(*c*) 50(*d*) will be in fully retracted position likewise when the bowlers end is changed 50(*b*) and 50(*f*) will be in fully extended position whereas the remaining four umpire bots 50(*a*) 50(*c*) 50(*d*) will be in fully retracted position. When there is a right handed batsman 50 (*a*) and 50 (*b*) will be in fully extended position and remaining four umpire bots 50(*c*) 50(*d*) 50(*e*) will remain in fully retracted position, likewise when the bowlers end is changed 50 (*c*) and 50(*d*) will remain in fully extended position and the remaining four umpire bots 50(*a*) 50(*b*) 50(*f*) will remain in fully retracted position.

At the start of 2nd over the umpire bot 50(*c*) gets automatically assigned as the master umpire bot and it fully extends along with umpire bot 50(*d*) which is the slave umpire bot. In this situation, umpire bots 50(*a*) and 50(*b*) fully retracts and function as slave umpire bots. Throughout the game, umpire bots 50(*a*) and 50(*c*) alternate from master to slave roles at end of each over while umpire bats 50(*b*) and 50(*d*) continue to assume slave roles throughout the game.

Figure 5:
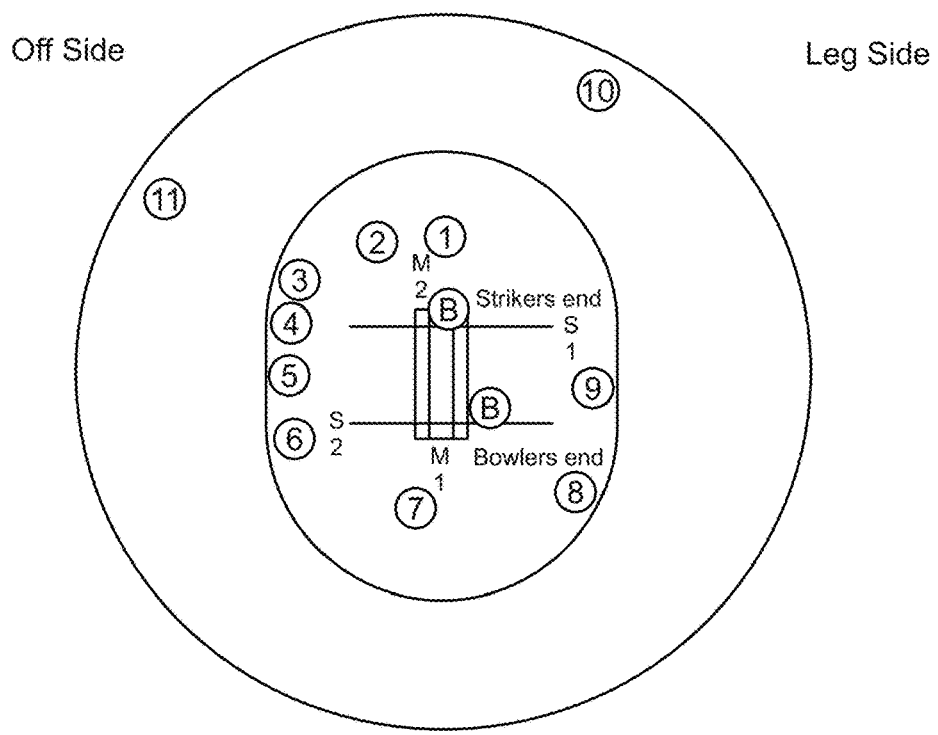
FIG. 5 is an illustration of top view of the umpire bot system, in accordance with one preferred embodiment of present disclosure.
Figure 5A:
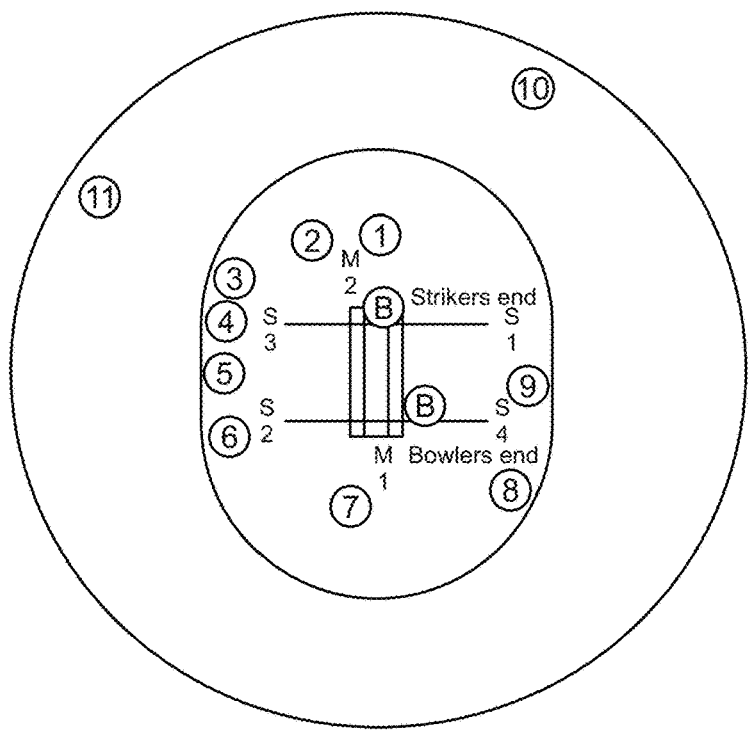

Only the assigned master umpire bot and its corresponding slave umpire bot at striker's end are in fully extended position, while the other two slave umpire bots' are in fully retracted positions. At any point of the game amongst the four-umpire bots there will be one master umpire bot and three slave bots. The detailed description below further explains the master umpire and slave umpire bots. In one exemplary embodiment, only the master umpire bot signals the umpiring and scoring decisions to the players and audience. The top view of umpire bot system with the entire field, player set up in the play area is shown in FIG. 5. Numeral 1 referring to wicket keeper, 2 to slip, 3 to gully, 4 to point, 5 to cover, 6 to mid off, 7 to bowler, 8 to mid on, 9 to mid wicket, 10 to fine leg, 11 to third man. Further, M1 refers to fully extended bowler's end umpire bot, S1 to fully extended striker's end umpire bot, M2 to fully retracted striker's end umpire bot and S2 to fully retracted striker's end umpire bot.

In one of the exemplary embodiment, shown in FIG. 5(*a*), only the assigned master umpire bot and its corresponding slave umpire at striker's end are in fully extended position, while the other for slave umpire bots' are in fully retracted positions. At any point of the game amongst the six-umpire bots there will be one master umpire bot and five slave bots. The detailed description below further explains the master umpire and slave umpire bots. In one exemplary embodiment, only the master umpire bot signals the umpiring and scoring decisions to the players and audience. The top view of umpire bot system with the entire field, player set up in the play area is shown in FIG. 5(*a*). Numeral 1 referring to wicket keeper, 2 to slip, 3 to gully, 4 to point, 5 to cover, 6 to mid off, 7 to bowler, 8 to mid on, 9 to mid wicket, 10 to fine leg, 11 to third man. Further, M1 refers to fully extended bowler's end umpire bot, S3 to fully extended striker's end umpire bot for a M2 to fully retracted striker's end umpire bot and S2 to fully retracted striker's end umpire bot. S1 to fully retracted strikers end umpire bot and S4 refers to the fully retracted strikers end umpire bot.

During the team and player registration, the image-capturing device 101 equipped with AI module 115 captures the player's facial identification and registers the player as 'unique' player and registers the information. Basis the facial identification and recognition, personal information such as name, age, team name, jersey no, location, home ground, role etc. is collected from the user and mapped for each user. Further, the professional information is obtained, especially related to the batting, bowling, all-rounder, highest score, recent record etc. In one other embodiment, other physical/medical information is obtained such as height, weight, favorite food, habits, fitness level, other sports interest, allergies, eye power, etc.

Figure 6A:
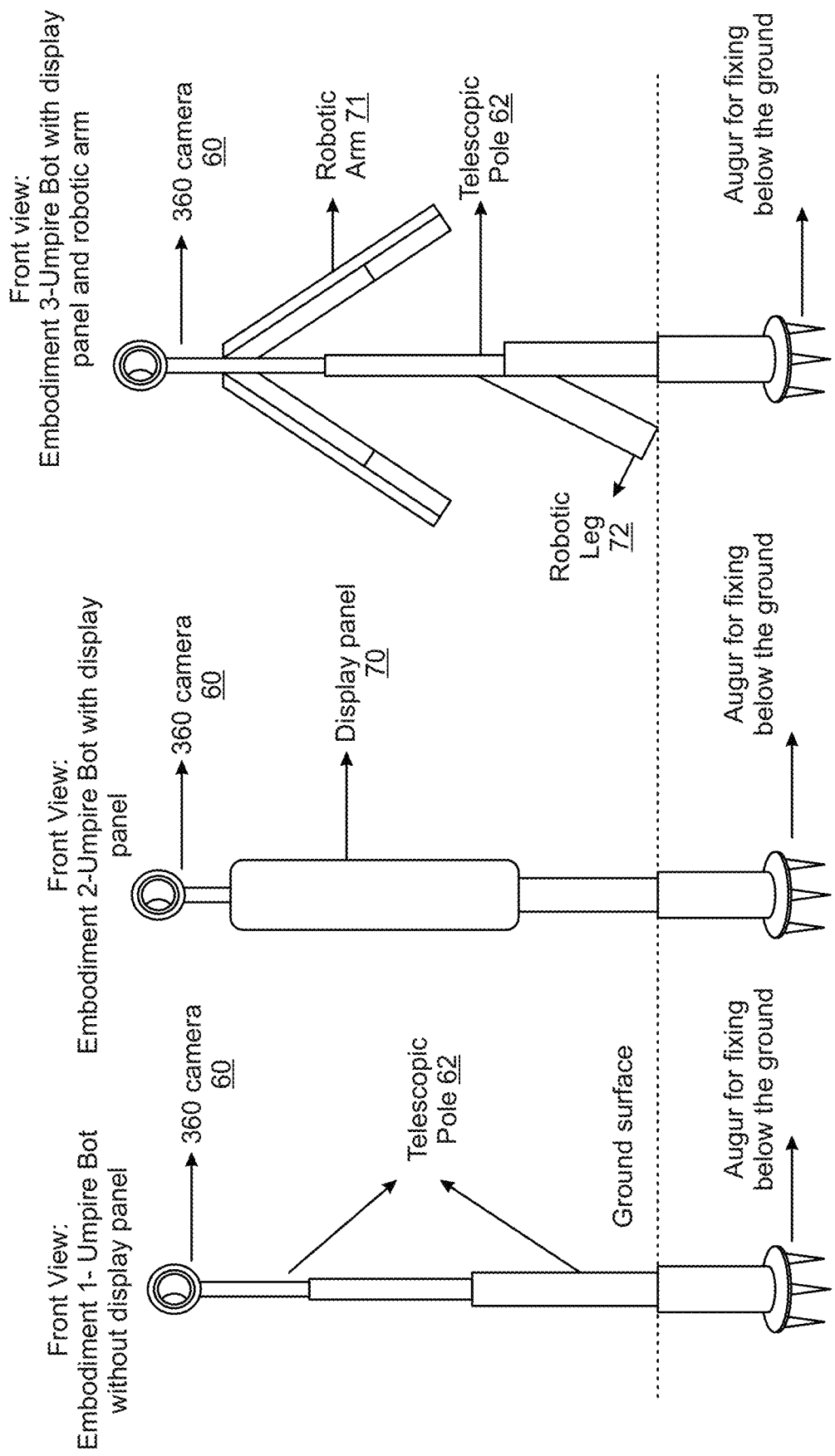
FIGS. 6(*a*) and 6(*b*) show different design embodiments of master umpire bot, in accordance with one preferred embodiment of present disclosure.
Figure 6B:
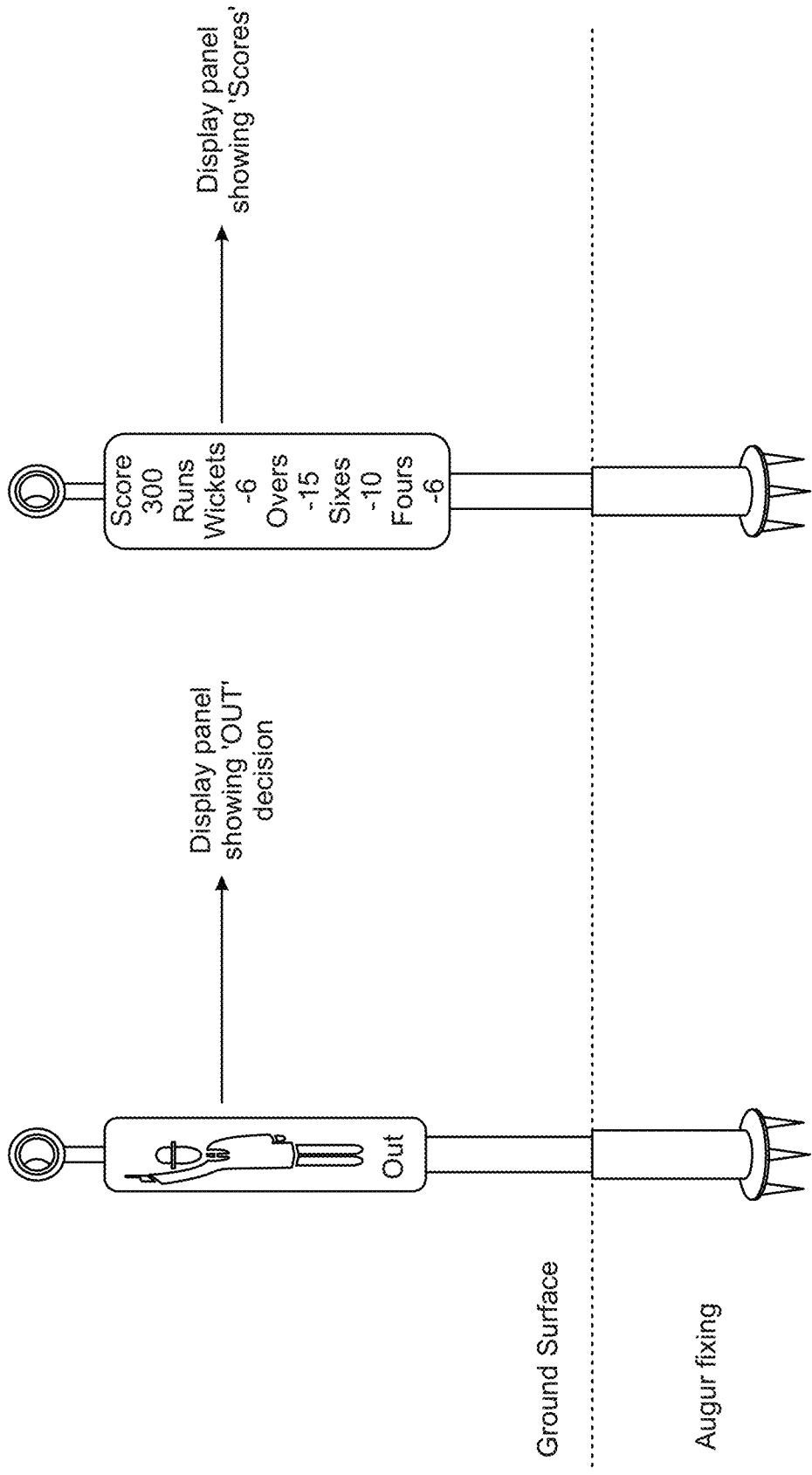

Precisely, in FIG. 6(*a*), in embodiment 1, front view of the umpire bot without a display panel is shown. This is an umpire bot embodiment for master and slave with only telescopic functionality enabled via a telescopic pole 62, the umpiring and scoring decisions being communicated verbally and displayed to players and audience through app and score board system in the play area. Next, in second embodiment, front view of umpire bot with display panel is depicted. In this embodiment, umpire bot master with telescopic functionality and visual display panel 70 communicates the scoring and umpiring decisions on itself, through verbal communications and through the score board system in the play area. Also, the display will interact with players for their coaching and training through display panel as well as verbal.

Figure 7:
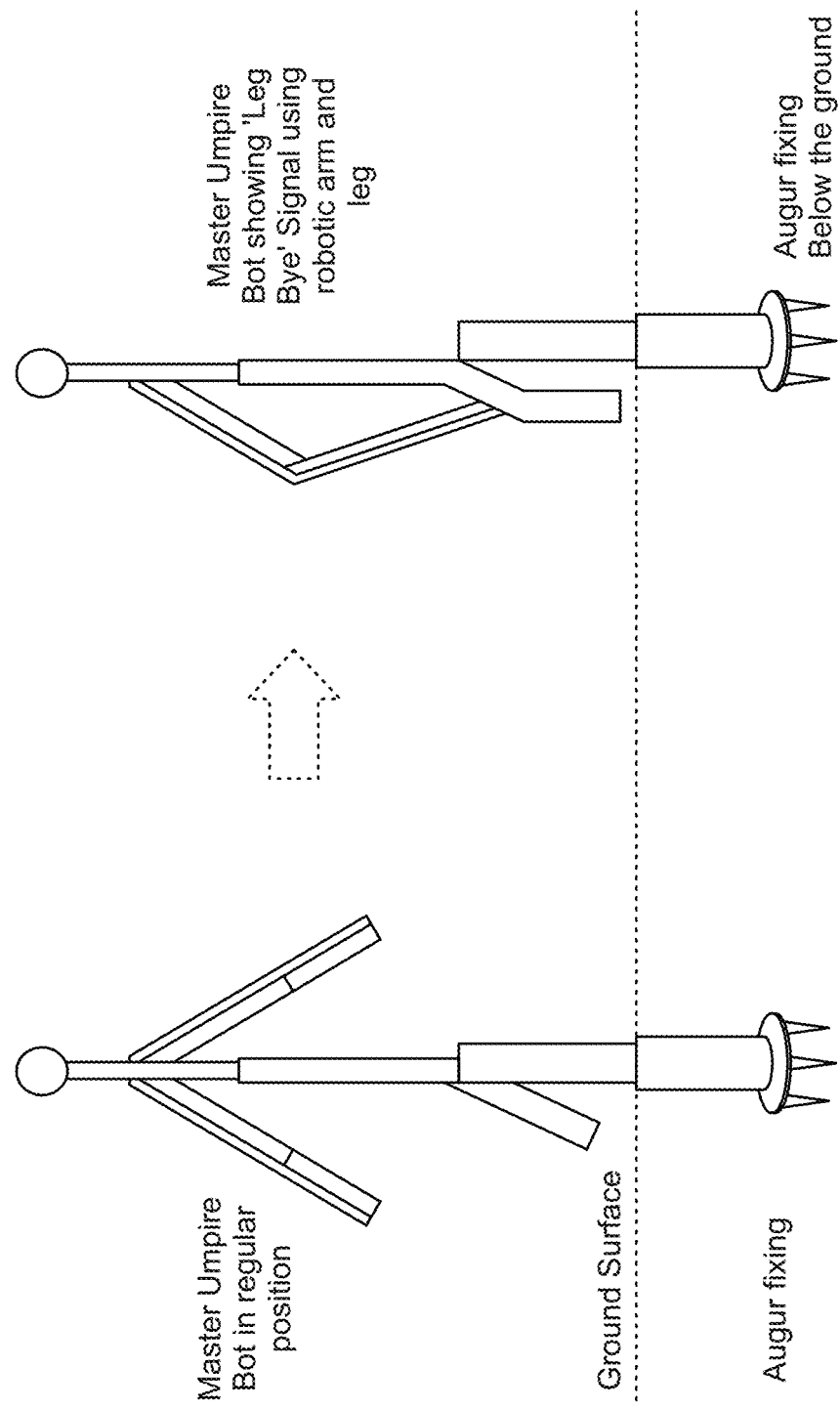
FIG. 7 shows umpiring decisions using robotic arm and leg movement, in accordance with one preferred embodiment of present disclosure.

In one exemplary embodiment of present disclosure, embodiment three shows umpire bot with display panel 70 and a robotic arm 71. Master umpire bot embodiment with telescopic functionality (pole 62) has robotic arm 71 and movable leg 72 to communicate the umpiring and scoring decisions as per official umpire signals. The umpiring and scoring decisions are communicated verbally and through score board system in the play area. Likewise, the display functionality showing umpiring and scoring functionality is shown in FIG. 6(*b*). FIG. 7 is an example of the umpire bot signaling umpire decisions through robotic arm 71 and leg movement 72.

Figure 8:
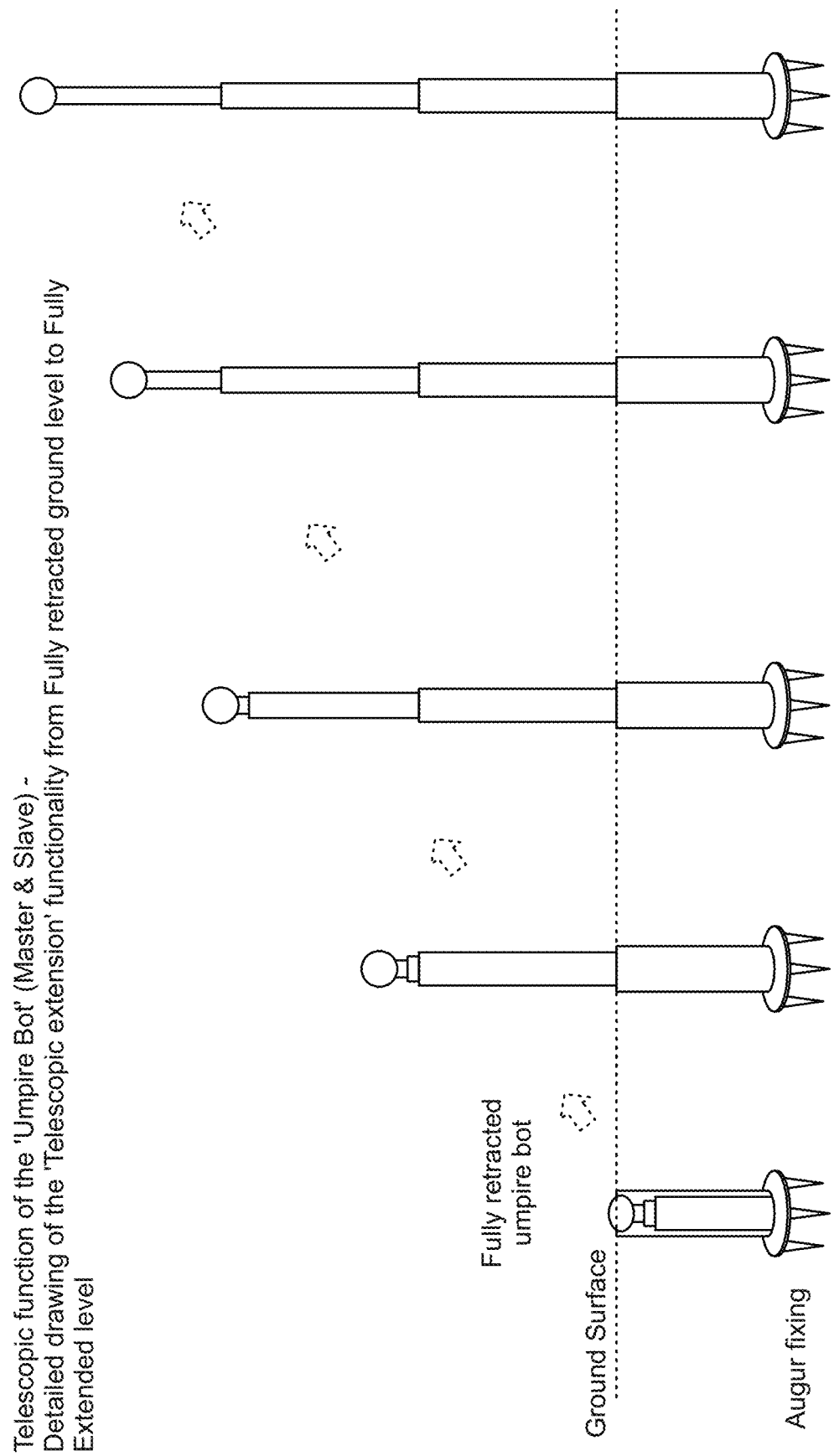
FIG. 8 shows intelligent telescopic functionality of umpire bot system, in accordance with one preferred embodiment of present disclosure.
Figure 9:
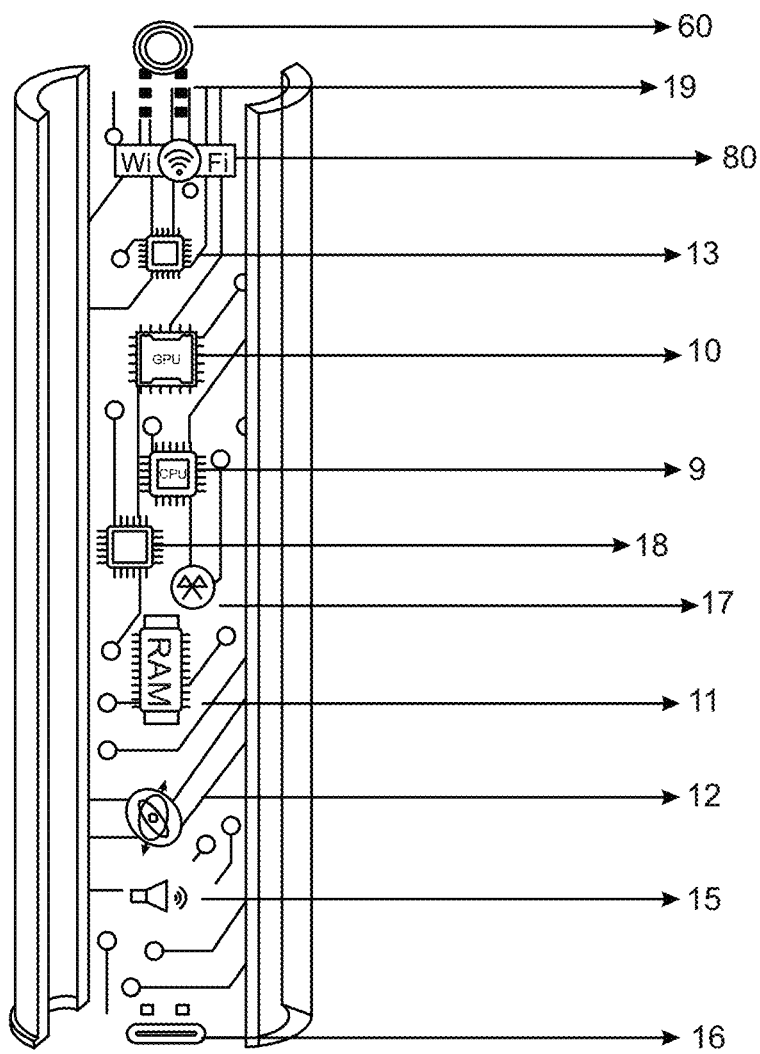
FIG. 9 depicts cross section of master and slave umpire bots, respectively, in accordance with one preferred embodiment of present disclosure.

Now, FIG. 8 shows the detailed working of 'intelligent telescopic functionality' of the umpire bot by which it fully retracts and fully extends as per the game rules. FIG. 9 depicts cross section of the master & slave umpire bots 50. Broadly, the master and slave umpire bots 50 have been designed with an inbuilt camera hardware/chip 60 as one part by which it has the capability of capturing 360-degree video. In one exemplary embodiment, the umpire bots 50 have an embedded chip controller 61, which will be integrated with 360 degree camera 60, and it will have integrated components like a Processing unit 9, Graphics Processing Unit (GPU) 10, Memory 11, gyroscope 12, Neural Processing Unit (NPU) 13, Audio and Mic 15, power source 16, bluetooth 17, audio processing unit 18 and will 80. Further, the umpire bot 50 has an inbuilt battery charge which is charged using conventional adapters 19.

Figure 10:
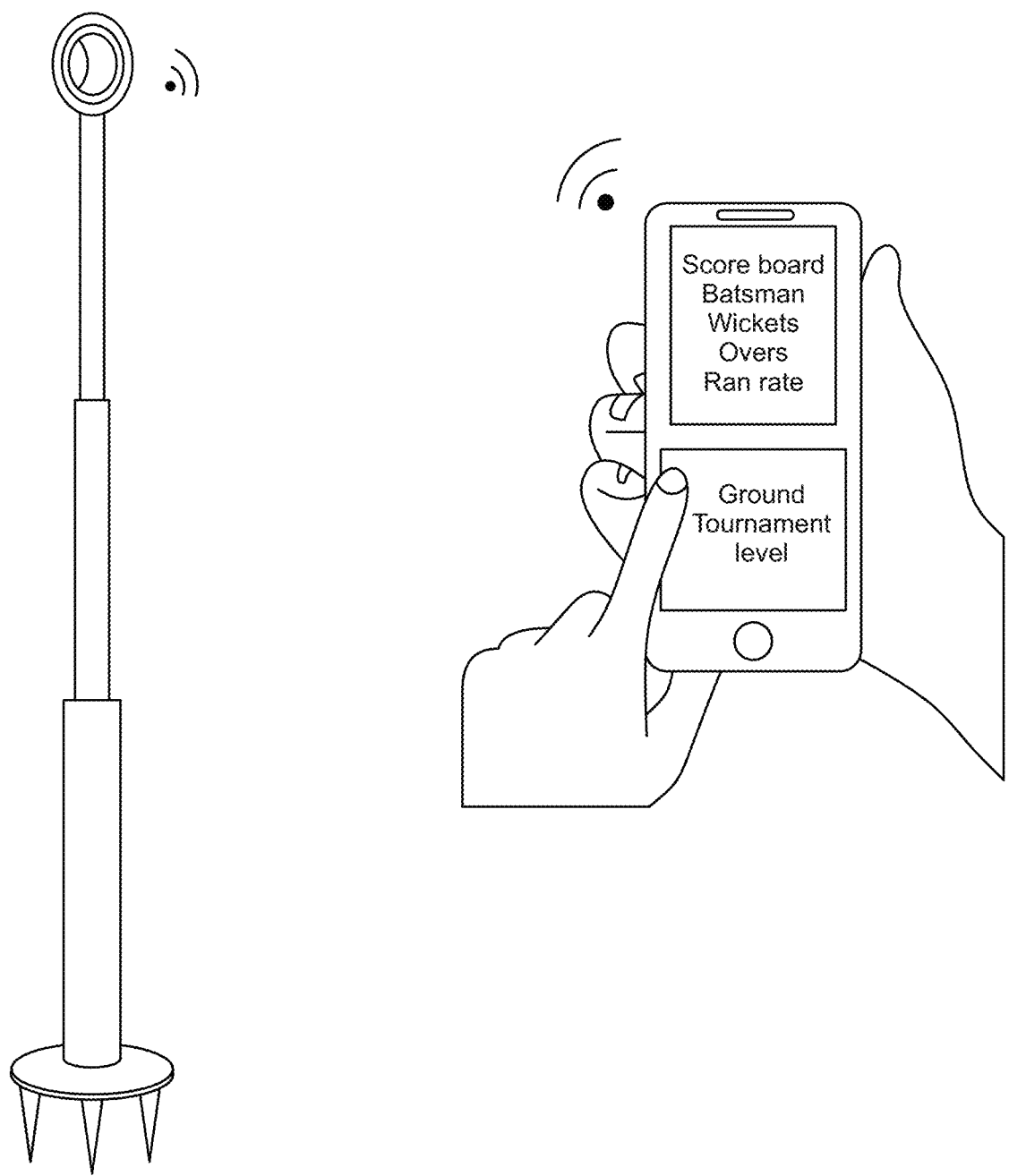
FIG. 10 shows interaction between master umpire bot and review system and mobile app through wireless technology, in accordance with one preferred embodiment of present disclosure.
Figure 11:
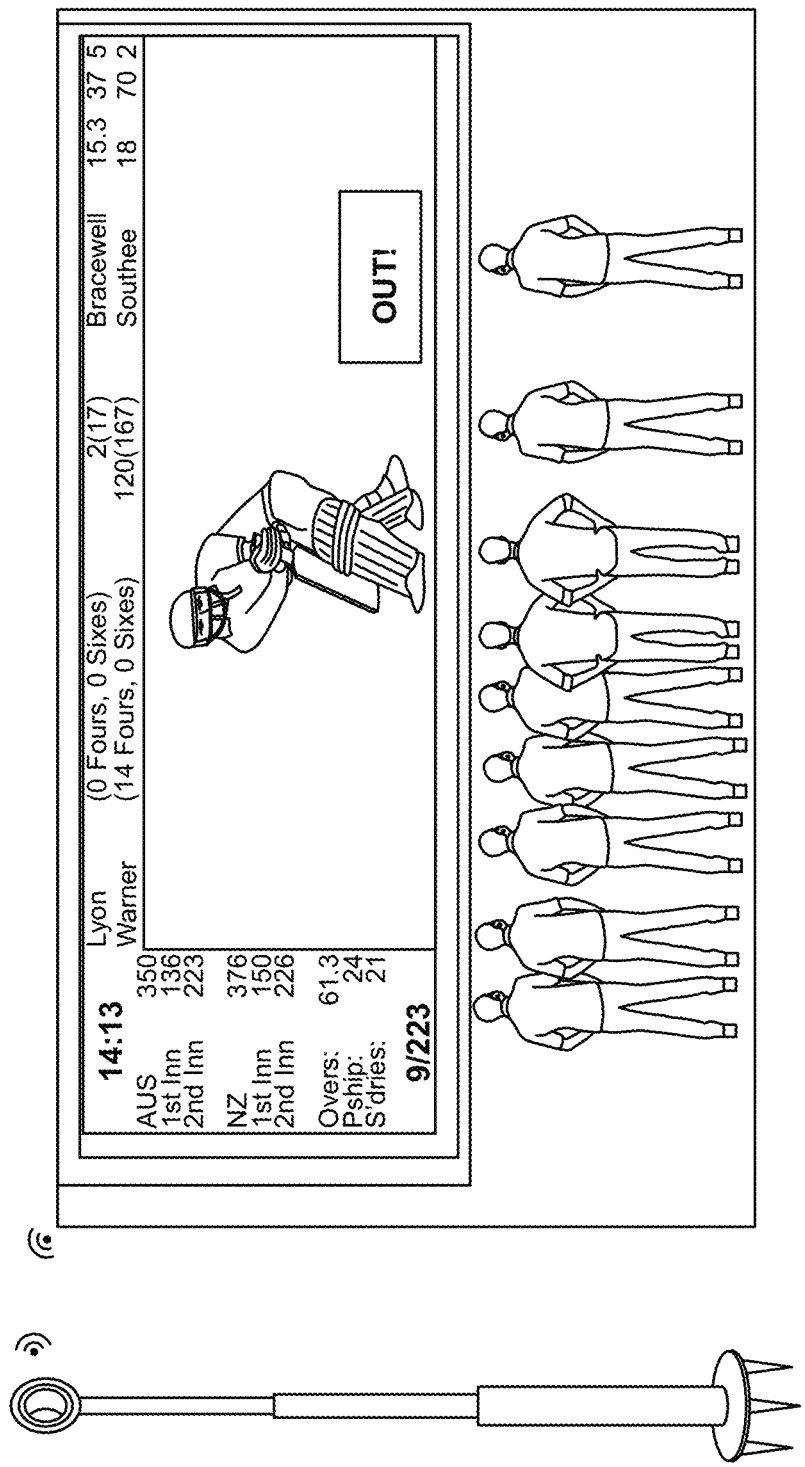
FIG. 11 is an illustration of interaction between the master umpire bot 50(*a*) and the scoreboard & review system for players and audience in the play area, in accordance with one preferred embodiment of present disclosure.
Figure 12:
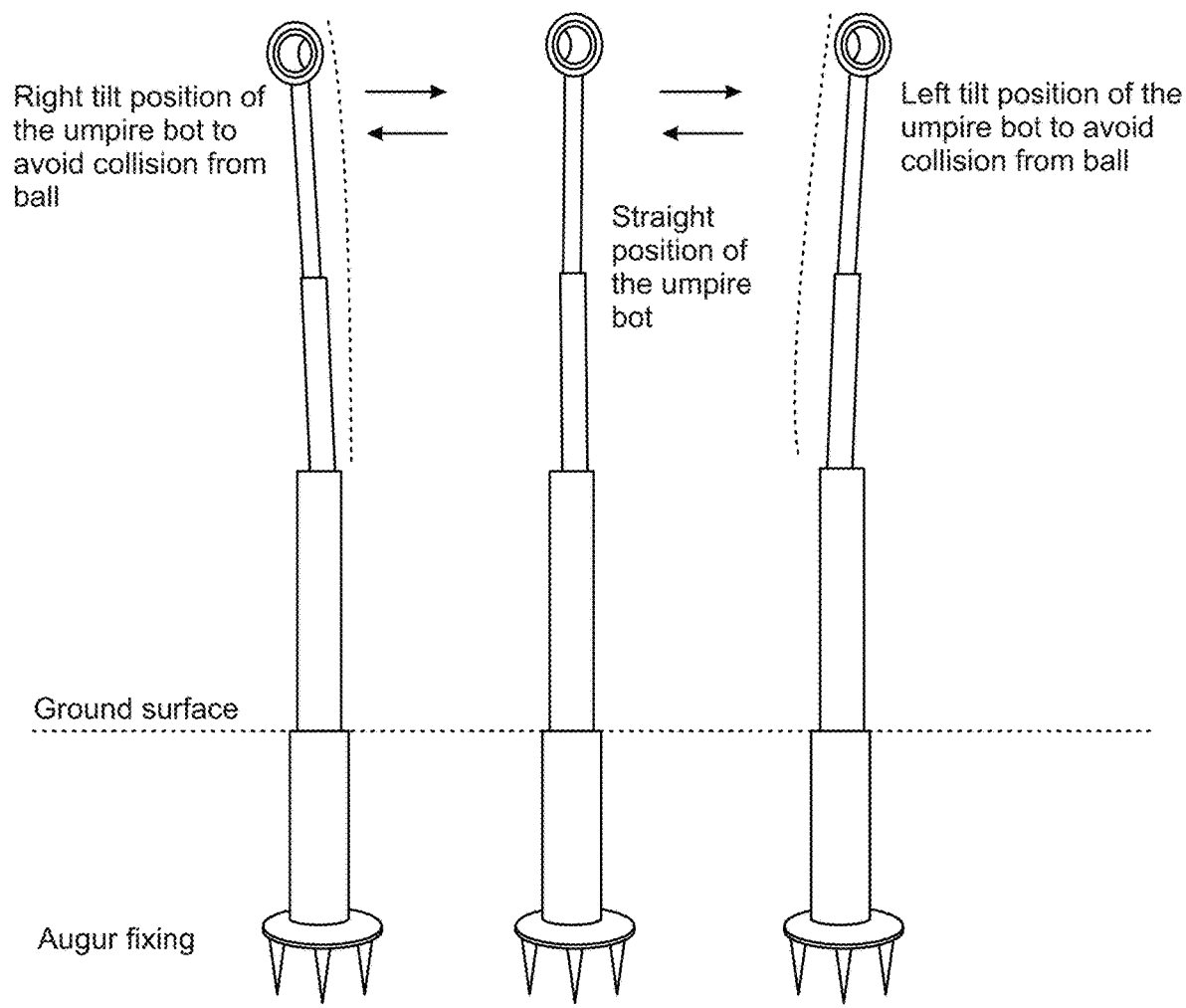
FIG. 12 is an illustration of flexi-intelligent movement of the umpire bot to avoid ball collision, in accordance with one preferred embodiment of present disclosure.

FIG. 10 shows the detailed drawings of the interaction between the master umpire bot 50(*a*) and mobile app 51 through wireless technology 80. FIG. 11, on the other hand, shows the detailed drawings of the interaction between the master umpire bot 50(*a*) and the scoreboard & review system for players and audience in the play area. Next, FIG. 12 shows the flexi-intelligent movement of the umpire bot to avoid ball collision. Basis the ball trajectory after the ball hitting the bat, the umpire bot is able to predict if the ball is travelling towards it. It order to avoid collision, the 'Intelligent umpire bot' is slightly able to tilt itself to the left and right and comes back to the original position after avoiding impact. While avoiding this collision, only 360-degree camera 60 and upper telescopic pole swings to the left and right while the base is firmly held in its current position on the ground.

Figure 13:
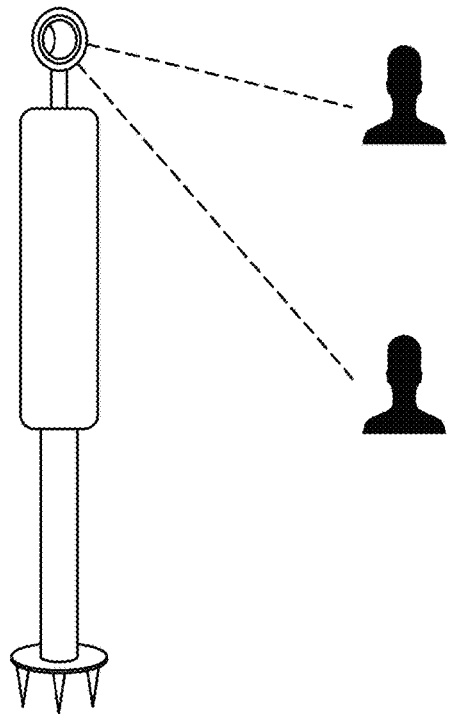
FIG. 13 is an illustration of identifying players using AI, in accordance with one preferred embodiment of present disclosure.

Next, the umpire bot device 50 is ready by setting up itself and its pitch & boundary. Now it will start reading the users and identify them. FIG. 13 shows the automatic player identification by the master and slave umpire bots (or) by an application running independently running in electronic camera unit as service. The information about the players is gathered during the team registration, which happen before the match or during the match. This information about the players name, age, team, their individual profile, their role (player, captain, coach, manager, etc.), statistics and team name will get stored in database 103. This information will be used later to build user profile by user profile module 145, training module 135 and by AI module 115.

Figure 14:
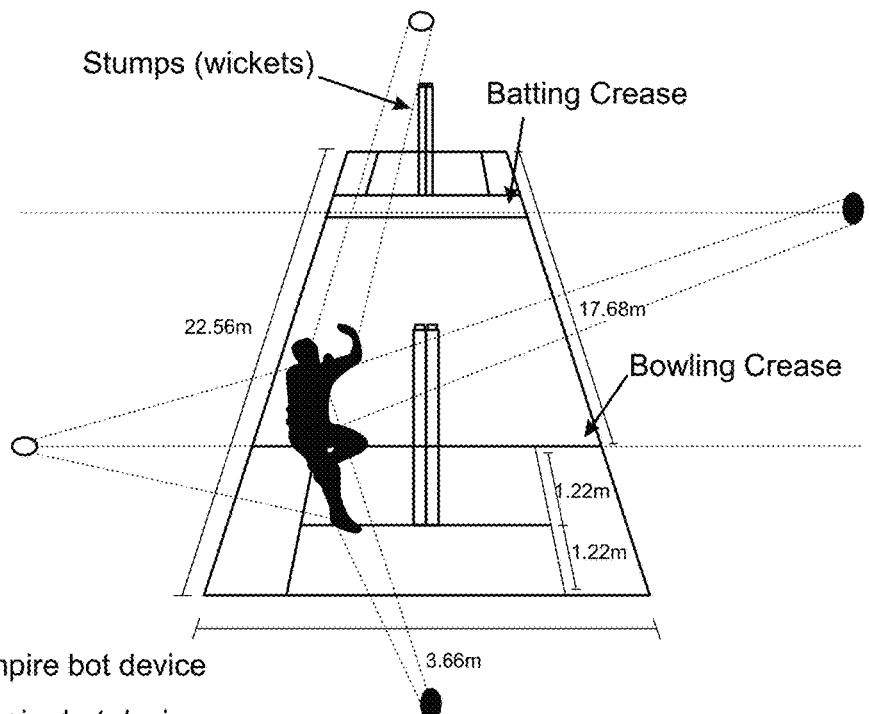
FIG. 14 is an illustration of AI module capturing bowler action continuously, in accordance with one preferred embodiment of present disclosure.

The platform, which runs in the umpire bot 50, placed at bowler's end position, will also have the capability of capturing the game sequence and identify the actions that are performed in the game. FIG. 14 shows the AI module 115 that captures the bowler action continuously and takes decision as per game rules at run time. As a continuous process, on every match day the AI module 115 will keep transferring the data to cloud and over the period, it will start learning about the ball(s) bowled by them.

As the outcome of learning, it starts training the bowler to bowl the ball at right place and right length. This information will get captured during complete game and save those data against their user profile. Below are the sequences of action that will be performed when a bowler starts bowling a ball.

Figure 15:
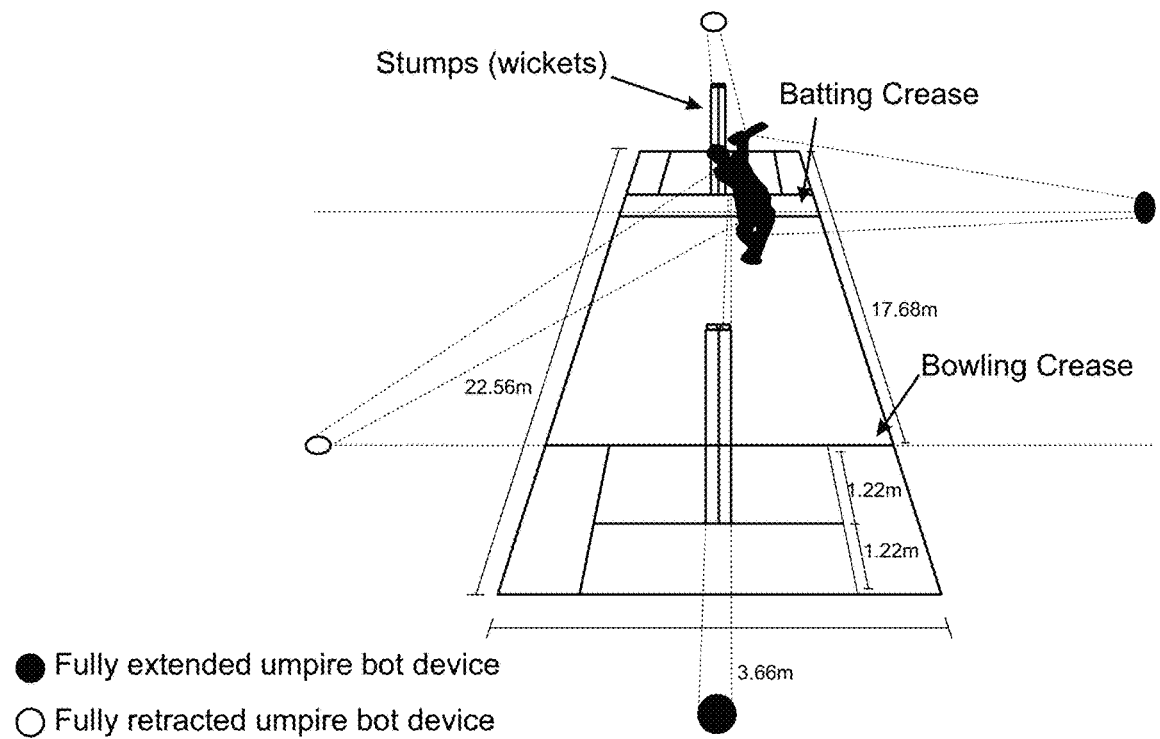
FIG. 15 shows AI module capturing batsman action continuously, in accordance with one preferred embodiment of present disclosure.
Figure 16:
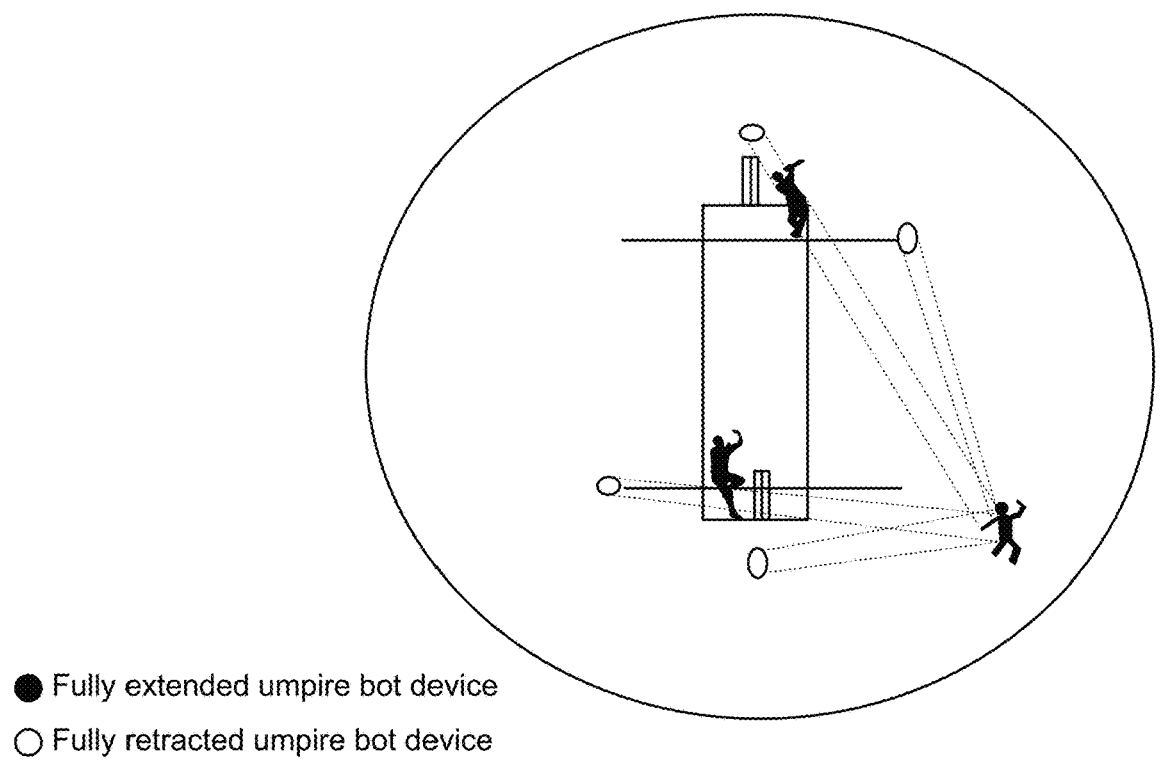
FIG. 16 shows AI module capturing fielder's action continuously, in accordance with one preferred embodiment of present disclosure.

Recognizing the bowler
Bowling action/style
Bowling speed
Ball validity (correct ball or no-ball)
Ball trajectory The combination of modules operating within the umpire bots 50 placed at both bowler's and striker's end will also has the capability of capturing the game sequence and identify actions that are performed in the game. FIG. 15 shows how the AI module 115 captures the batsman action continuously and take decision as per game rules at run time. As a continuous process, on every match day the AI module 115 keeps transferring the data to cloud and over the period of time it will start learning about the batsman shorts & body postures and assist batsman on their batting like shot selection or leg movement during attempting the shots. This information is captured during complete game and save those data against their user profile. Below are the sequences of actions that will be performed when a batsman starts facing a ball:

Recognizing the batsman
Batting action/batting shot style
Bat speed
Bat-Ball sweet spot connect
Ball hit speed
Overall rating of the shot
Quality of shot The operable modules running within the umpire bots 50(*a*) and 50(*b*), placed at both bowler's and striker's end respectively, also has the capability of capturing the game sequence and identify the actions that are performed in the game. FIG. 16 shows how the AI module 115 captures the fielder's action continuously and take decision as per game logic at run time. As a continuous process, on every match day the AI module 115 keeps transferring the data to cloud and over the period of time, it will start learning about the players pose during fielding & assist the fielders on their fielding actions during catch, drop catches, body position during the course of taking the catch. This information is captured during complete game and saved against their user profile. Below are the sequences of action that is performed by the platform when a fielder performs anything during fielding.

Umpire Bots (Master & Slave)
Recognizes the player
Fielding position
Decision on catch (Out/Not-out)

Figure 17:
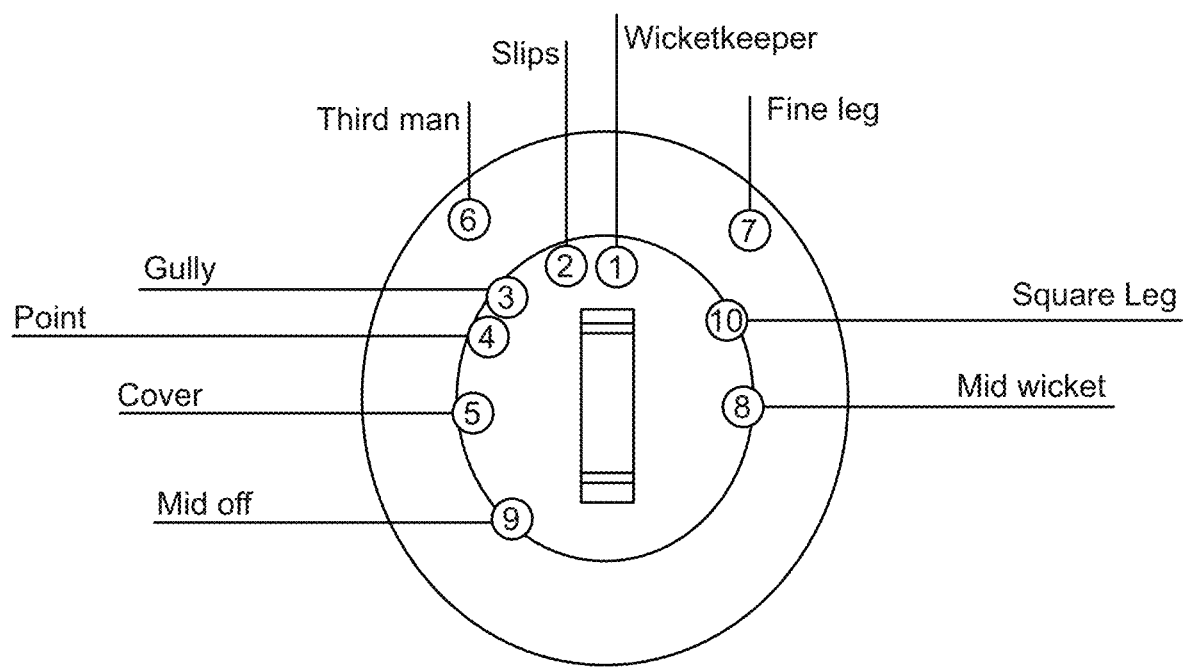
FIG. 17 shows AI module capturing fielder's position continuously, in accordance with one preferred embodiment of present disclosure.
Figure 18:
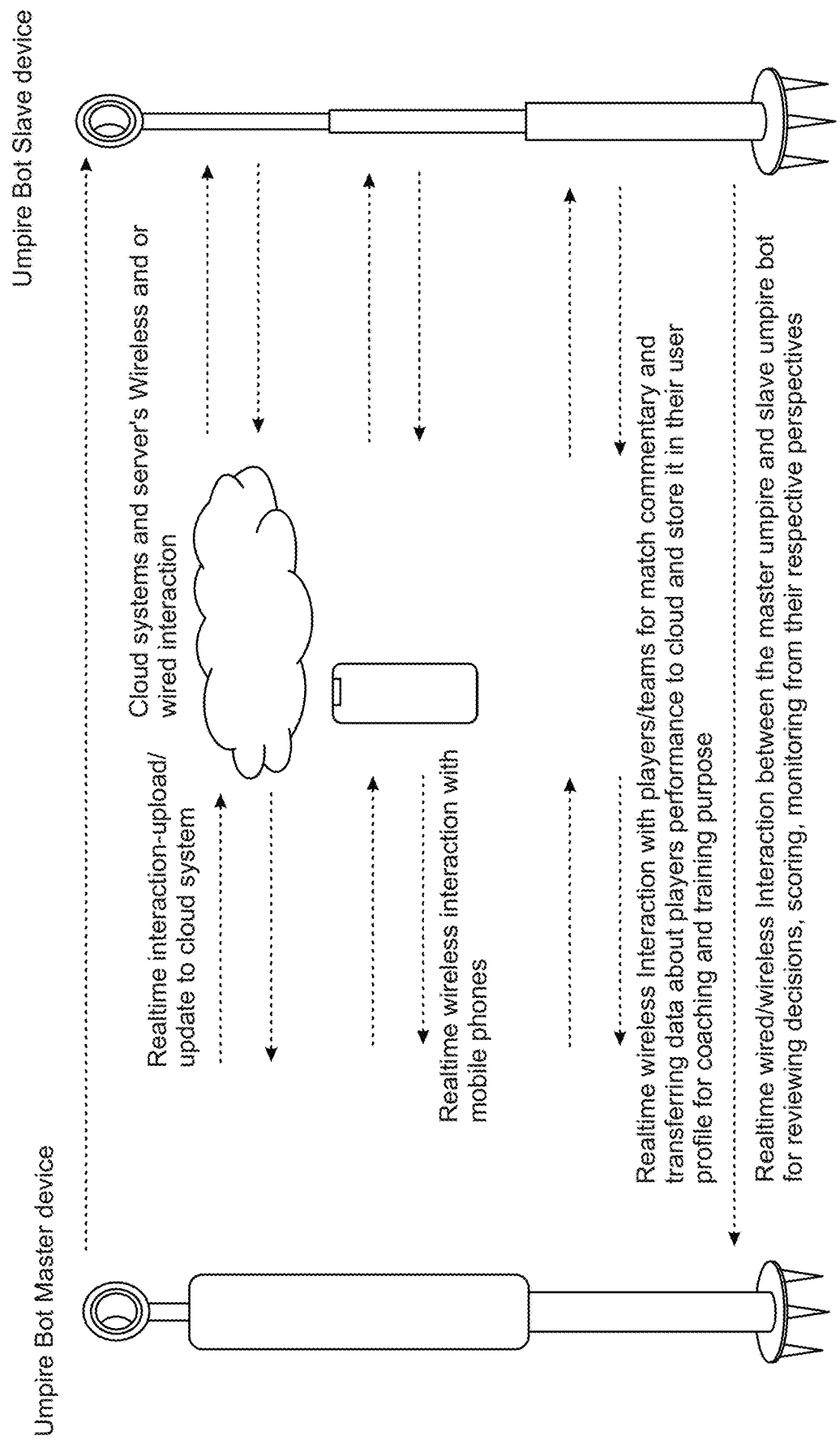
FIG. 18 shows process flow of master and slave bots interacting with cloud system, in accordance with one preferred embodiment of present disclosure.

The modules which runs in the umpire bots 50(*a*) and 50(*b*), placed at both bowler's and striker's end respectively, also has the capability of capturing the game sequence and identify the actions that are performed in the game. FIG. 17 shows how the AI module 115 captures the fielder's action continuously and by which the position of fielder position is used to identify the player involved in run-out, catch, etc. at run time. This information is captured during complete game and saved against their user profile. Below are the sequences of action captured by the platform during the field:
Umpire bot (Master & Slave)
Recognizes all the team/players
Identifies the field position
Batsman/Bowler/Wicketkeeper The umpire bot devices 50(*a*) and 50(*b*) have a capacity to transfer their data to cloud through any network protocol. Each live match sequence, the associated data (videos and images) is transferred using real-time wireless/Bluetooth interface/wired technology. This data will be used to segregate each player game, transfer data about player's performance to cloud, and store it in their user profile for training purpose. The data in cloud is again processed for making an interesting game sequence of a complete match to 30-40 min highlights. FIG. 18 is a depiction of process flow of how master and slave bots 50*a* and 50*b* interact with cloud system.

Figure 19:
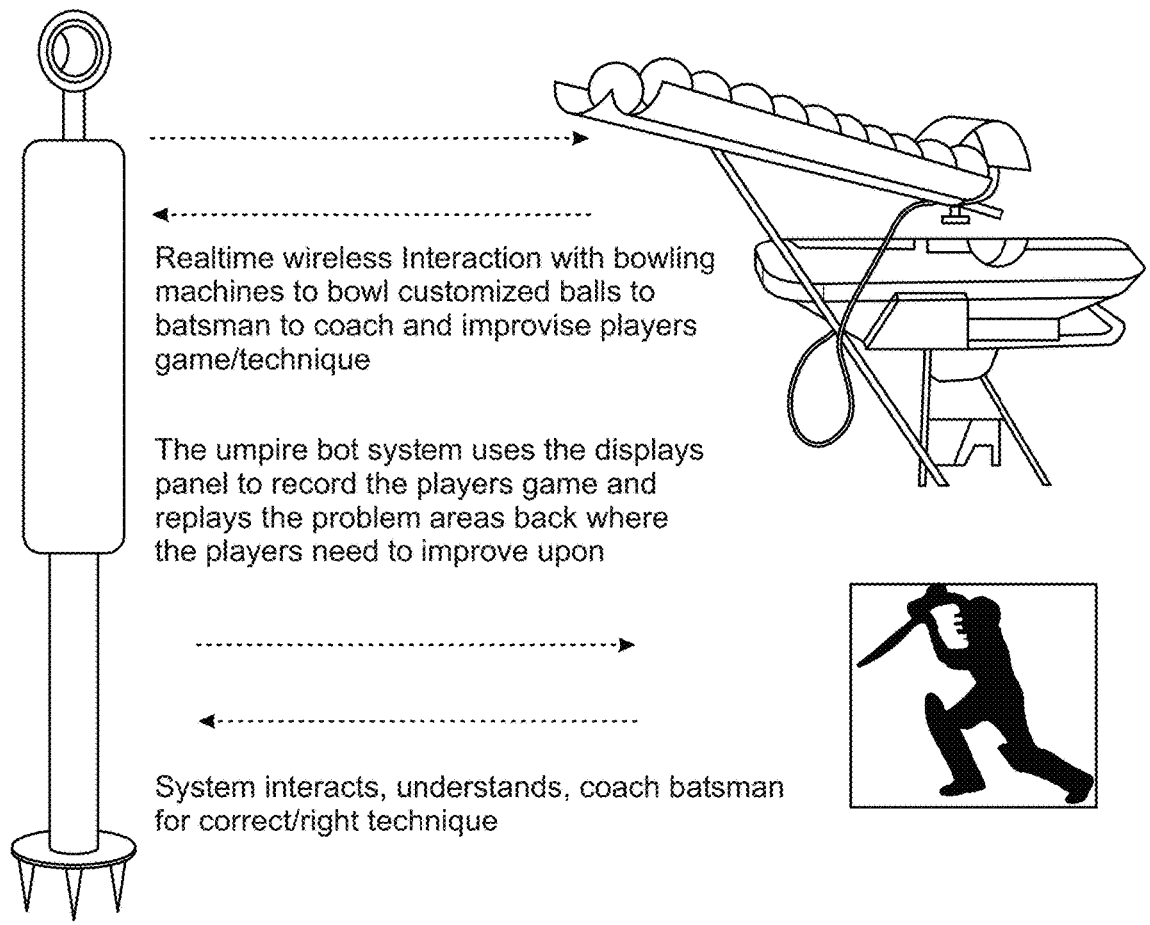
FIG. 19 shows the umpire bot training players batting based on user profile data, in accordance with one preferred embodiment of present disclosure.

Since umpire bot 50 captures the complete game, it gets stored in cloud. The AI module 115 from the cloud data will provide inputs to correct the mistakes done by players and improves them for upcoming games. This is done by segregating the players data based on each player performance and store this data against user profile. Each user profile will be sequence of actions that are done by them. This user profile data will be given as input to bowling and automated machines and make them bowl customized ball to batsman and make them improve their games on their weakness likewise will help batsman to play with better footwork, timing and techniques. FIG. 19 clearly indicates the umpire bot training players batting based on user profile data.

Figure 20:
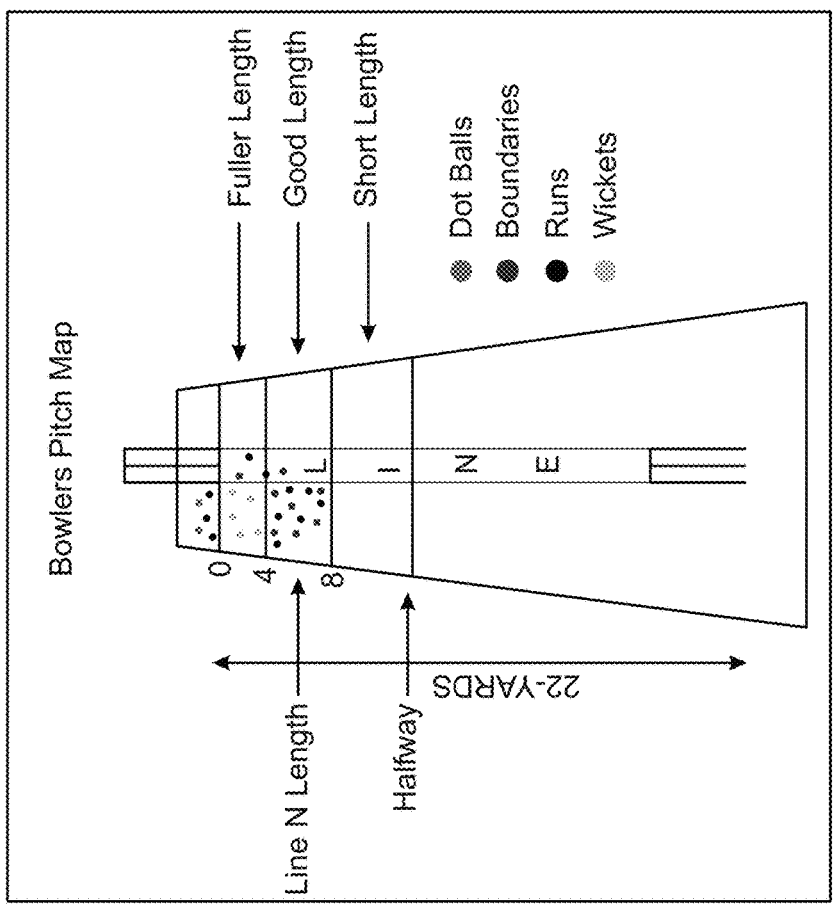
FIG. 20 shows the umpire bots used to train bowlers based on his user profile, in accordance with one preferred embodiment of present disclosure.
Figure 20:
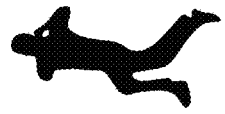
Figure 20:
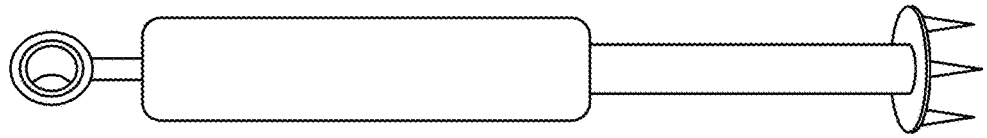

Since the umpire bot 50 capture the complete game, it gets stored in cloud. The AI module 115 from cloud data provides input to correct the mistakes of players and improvises them for upcoming games. This is accomplished by segregating the players data based on each player performance and store against user profile. Each user profile will be sequence of actions that are performed by player himself or herself. This user profile data will be validated based on their past bowling actions and how they have bowled so far, their bowling mistake with respect to bad ball will be validated based on line and length that they have bowled, dot balls, boundaries leaked and wickets taken. This information will help them to improve their games on their weakness. FIG. 20 clearly indicates the umpire bots used to train batsman based on his user profile.

Figure 21:
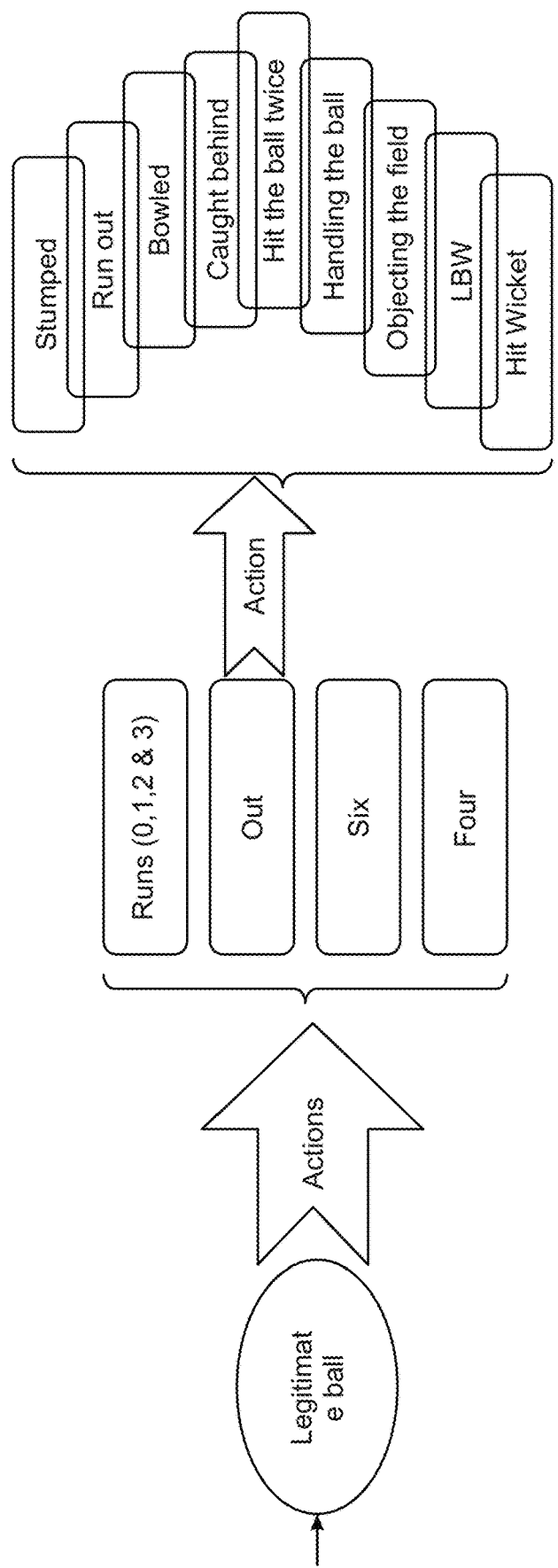
FIG. 21 is a logical sequence of umpiring decision, in accordance with one preferred embodiment of present disclosure.

As can be deduced from above, the umpire bots 50(*a*) and 50(*b*) play a key role in umpiring decisions. FIG. 21 shows the logical sequence of umpiring decision. Below is the sequence that is performed by AI module 115 from first ball bowled:

1) Check for legitimate ball by detecting "no ball"
2) if the ball is a legitimate one, master and slave umpire bots 50(*a*) and 50(*b*) will check for wide. Wide ball will be determined based on identifying the batsman stride (left or right hand).
  a) if the ball is a legitimate one, umpire bot (master and slave) will check for wide. Wide ball will be determined based on identifying whether batsman is able to connect to the ball with respect to his guard and ball trajectory across the side-line crease.
  b) The AI module 115, which runs on umpire bots, identifies the ball trajectory with respect to batsman stride.
  c) Umpire bot will also determine the bounce wide based on batsman height.

3) If the ball is legitimate without wide or no ball, umpire bot 50 will start tracking the game flow and identify any of the below sequence:
  a. Runs scored by batsman—single, doubles, threes, fours and sixes
  b. Detecting the out—stumped, run out, bowled, caught behind, hit the ball twice, handling the ball, objecting the fielding, LBW & hit wicket.

Figure 22:
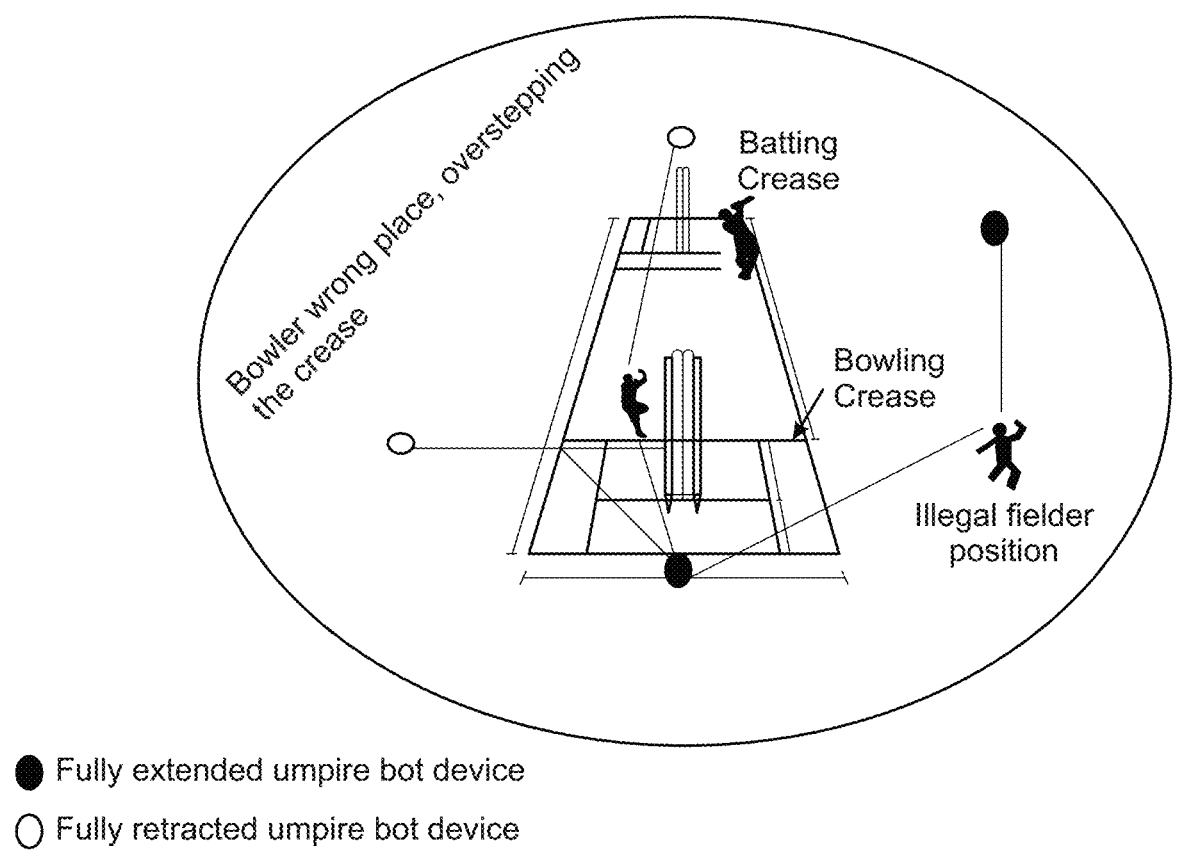
FIG. 22 indicates umpire bot providing umpiring decision based on different game rules that are followed for no ball, in accordance with one preferred embodiment of present disclosure.

Umpire bot 50 performs thorough and continuous logical review of the checklist for all cricket rules. Alongside master and slave umpire bots does a real time monitoring and capture all movements—bowler, batsman, wicketkeeper actions, fielder positions, equipment monitoring, pitch and crease. Further, it continuously checks for validity of the ball when delivery is bowled. If a ball is valid and if the following scenario happens 'umpire bot 50 declares a 'No-ball'. FIG. 22 shows an umpire bot (master & slave) providing umpiring decision based on different game rules that are followed for no ball.

1. No-ball case 1: umpire bot (master and slave) performs real time monitoring and capturing of the bowler's crease (line) and bowler movements (esp. position of leg on crease line). Any bowling from wrong position and crossing the crease will declare the ball as a No-Ball.
2. No-ball case 2: umpire bot (master and slave) performs real time monitoring and capturing of the bowler's actions, crease, all the fielders in positions and ball trajectories. If bowled at the batsmen's body on the full, if bounces more than twice or rolls before reaching the batsman or if fielders are standing in illegal positions, then the ball is declared No-ball.
3. Once No-ball is declared, both visible & verbal on both master umpire bot display interface 70, simultaneously, the batsman can hit a no ball and score runs off it but he cannot be declared out on a no ball except if they are run out, hit the ball twice, handle the ball or obstruct the field. The batsman gains all runs scored off the no ball for his shot while the team also gains one run for the no ball itself.
4. The runs scored, and one run gained from the no-ball are added and visible and verbal on the display interface 70 (Master & Slave system).

Figure 23A:
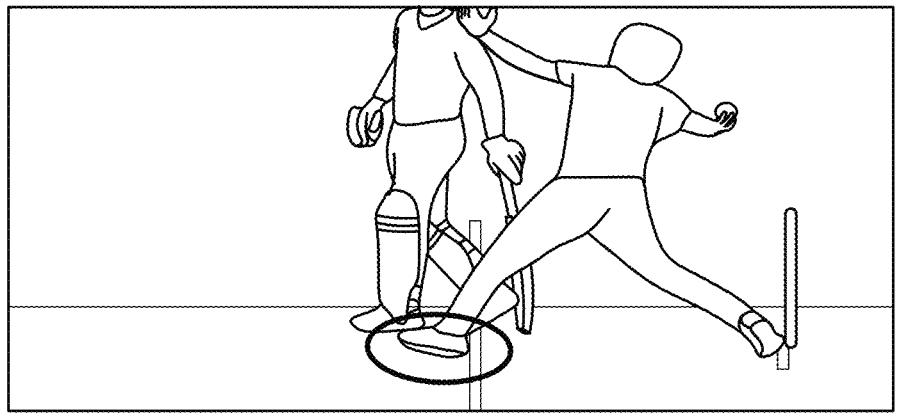
FIG. 23(*a*) is a side view of detection of no ball and FIG. 23(*b*) is a side view of legitimate ball, in accordance with one preferred embodiment of present disclosure.
Figure 23B:
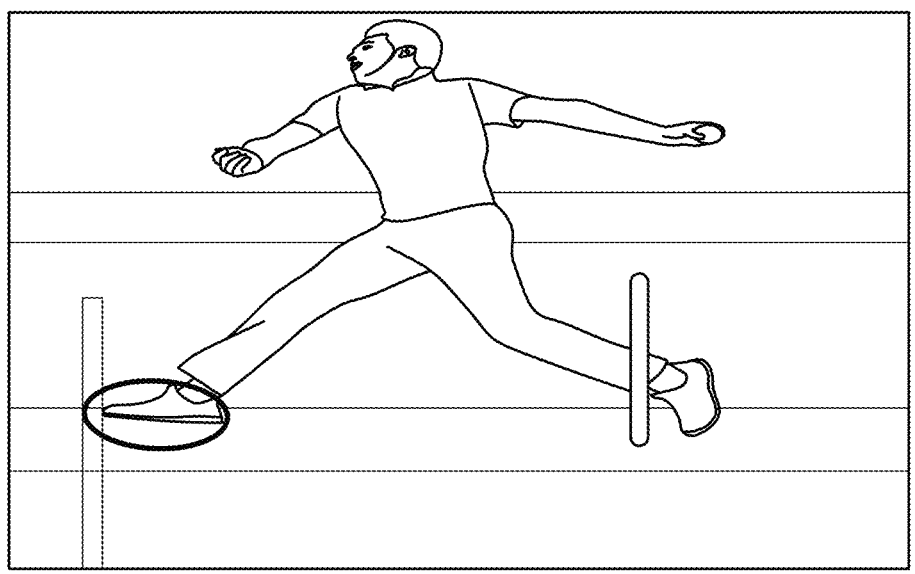

FIG. 23 is depicting no-ball decision by checking foot of the bowler at popping crease. FIG. 23(*a*) shows the side view wherein the bowler front foot slightly crossed the bower popping crease—by which the system will identify this as NO Ball. FIG. 23(*b*) shows the side view wherein the legitimate ball by which the bowers landed his front foot on the line of popping crease.

Figure 24:
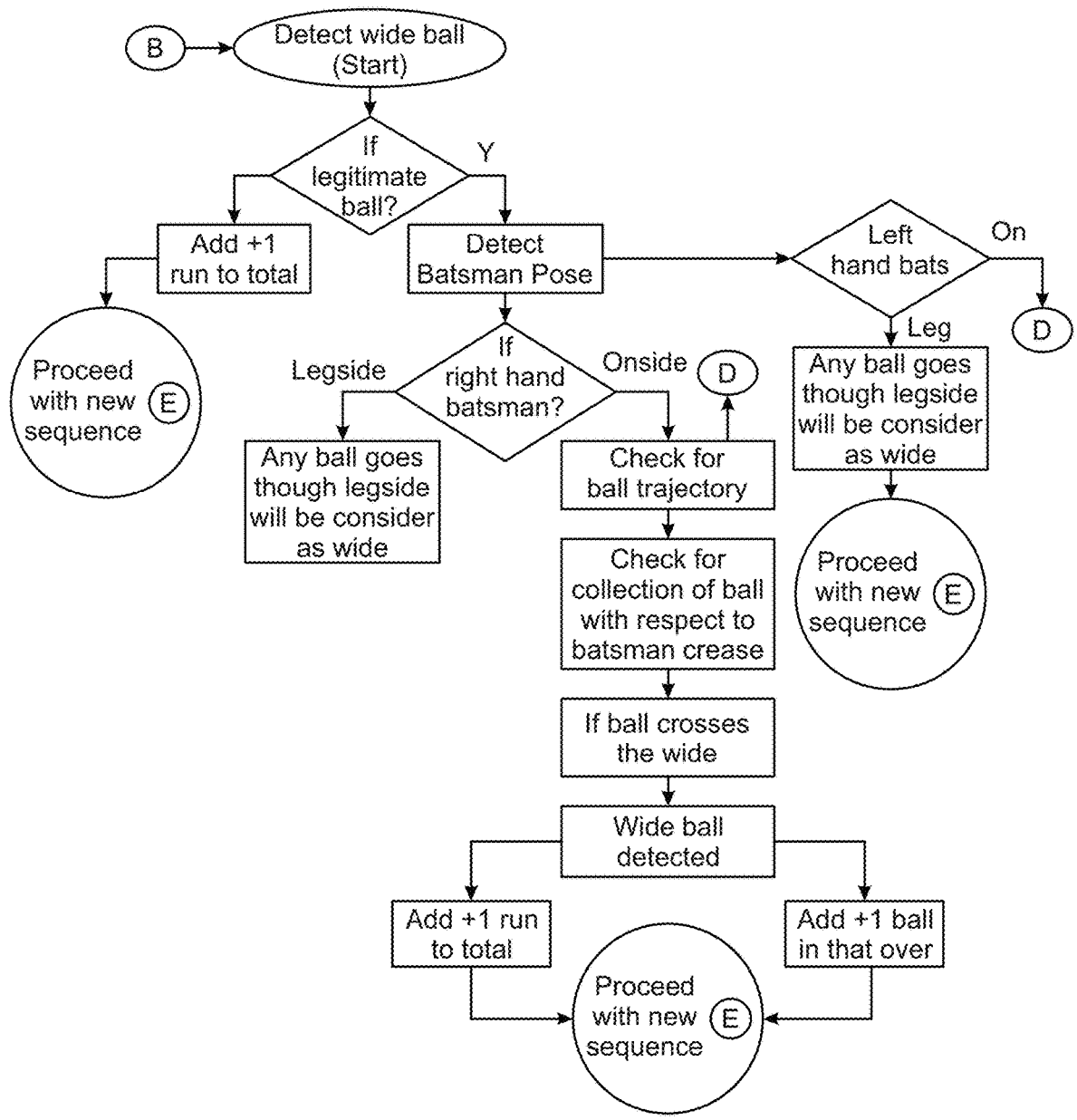
FIG. 24 shows automatic umpiring decision for wide ball validation, in accordance with one preferred embodiment of present disclosure.
Figure 25:
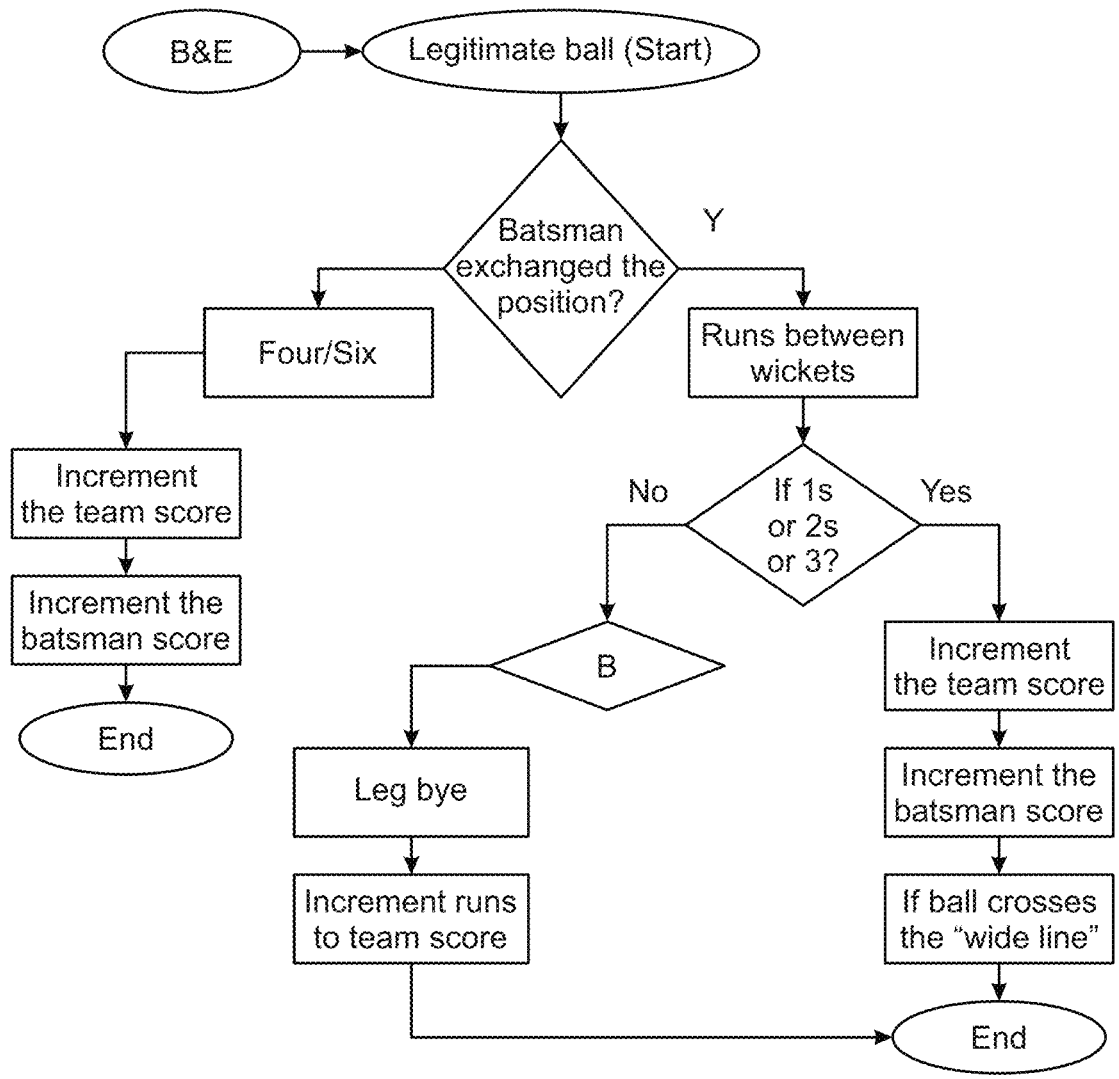
FIG. 25 shows automatic scoring workflow, in accordance with one preferred embodiment of present disclosure.

FIG. 24 shows an automatic umpiring decision for wide ball validation. Umpire Bot (master & slave) 50 plays a key role on umpiring decision. The sequence is automatically performed by AI module 115 for detecting the "wide ball". In still other aspect of present disclosure, automatic scoring workflow/is depicted in FIG. 25. Umpire bot 50 play a key role in automatic scoring. The flow chart illustrates the sequence that is performed by AI module 115 for identifying the runs between wickets (1*s*, 2*s*, 3) along with "four" and "six".

One other embodiment presents umpire bot 50 (master & slave) that performs thorough and continuous logical review of the checklist for all cricket rules to make umpiring decisions when the batsman is stumped. AI module 115 which runs on master & slave umpire bot does real time monitoring and capturing of all movements—bowler, batsman, wicketkeeper actions, fielder positions, equipment monitoring, pitch and crease. Further, it continuously checks for validity of the ball when delivery is bowled. If the ball is valid, and if the following scenario happens when checking is done for the bails movement from the picture captured from different perspective of both 'master and slave umpire bot, the batsman is declared stumped.

Figure 26:
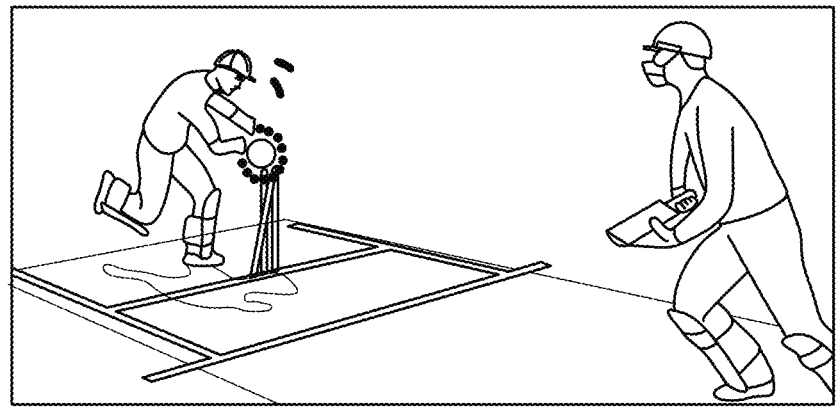
FIG. 26 shows umpiring decision for stumped, in accordance with one preferred embodiment of present disclosure.

The batsman is declared out according to cricket rules when the wicketkeeper puts down his wicket (bails displaced/dislodged) while he is out of his crease and not attempting a run (if he is attempting a run it would be a run out), as shown in FIG. 26. The umpire bot 50 declares 'STUMPED' on the display interface 70 (master & slave), both visibly and verbally.

Figure 27A:
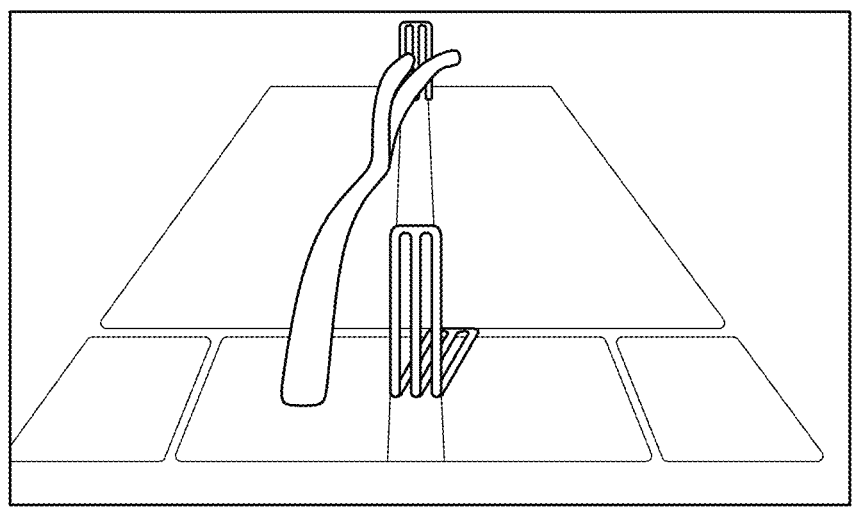
FIGS. 27(*a*) and 27(*b*) is umpire bot device for deciding LBW, in accordance with one preferred embodiment of present disclosure.
Figure 27B:
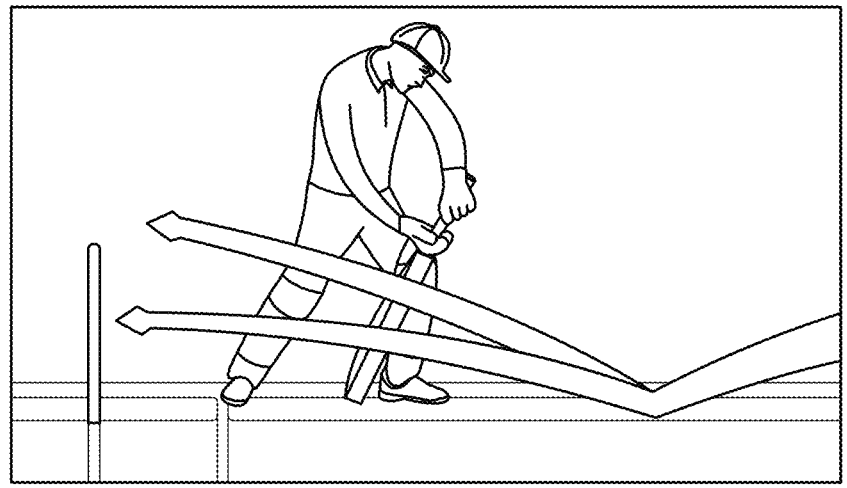

In next working embodiment, the umpire bot 50 (master & slave) performs thorough and continuous logical review of the checklist for all cricket rules, while making umpiring decisions for LBW (leg before wicket). The umpire master and slave bot performs real time monitoring and capturing all movements—bowler, batsman, wicketkeeper actions, fielder positions, equipment monitoring, pitch and crease. Precisely, the system performs the following for LBW decision checklist:

1. Valid ball by the bowler is determined based on bowler's leg position on the bowler end line.
2. Where the ball pitches and monitors the intended ball trajectory and it checks the ball depth between the bat and the ball.
3. Check the frames where the ball hits the batsman before hitting bat.
4. System will also use intelligence body movements based on "body pose" of the batsman understand if there is genuine attempt to play the ball.
5. System then tracks the ball trajectory and checks if it is going to hit the stump by calculating the ball depth, as shown in FIG. 27 (*a*).
6. Declares 'Out' by determining factors such as logic, trajectory and angle of impact based on depth between bat and pad, as shown in FIG. 27(*b*).
7. The umpire bot 50 declares 'LBW' on the display interface 70 (master & slave) thereby making the declaration both visible and verbal.

Figure 28:
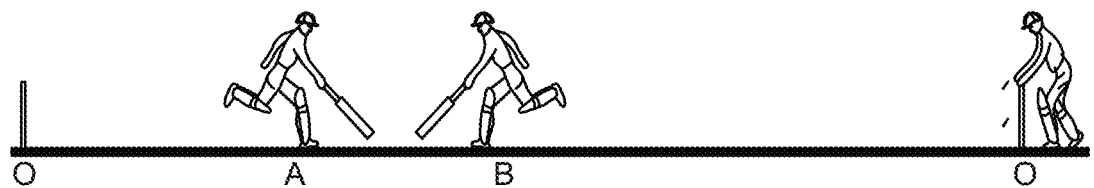

Next working embodiment illustrates umpire bot 50 (master & slave) that perform thorough and continuous logical review of the checklist for all cricket rules, now for umpiring decisions for run-outs. The umpire bot 50 performs real time monitoring and capturing all movements—bowler, batsman, wicketkeeper actions, fielder positions, equipment monitoring, pitch and crease. Further, the system does the following for run-out decision checklist:

1. For a valid ball by the bowler, it checks the foot of the bowler with respect to bowling pop-up crease.
2. Batsman is out if no part of his bat or body is grounded behind the popping crease while the ball is in play and the wicket is fairly put down by the fielding side.
3. Master & slave umpire bot monitors the bat position on the creases at both striker and non-striker end and monitors the bails displacement and gives decision of run-out accordingly for strikers/non-striker, as in FIG. 28.
4. The umpire bot 50 finally declares 'RUN-OUT' on the display panels (master & slave).

In next working embodiment, umpire but 50 (master & slave) does thorough and continuous logical review of the checklist for all cricket rules, when making an umpiring decision for BYE. The umpire bot 50 performs real time monitoring and capturing of all movements—bowler, batsman, wicketkeeper actions, fielder positions, equipment monitoring, pitch and crease. Further, the system does the following for Bye decision checklist:

1. Ensuring a valid ball by the bowler.
2. A "Bye" is where a ball that is not a no ball or wide passes the striking batsman and runs are scored without the batsman hitting the ball.
3. Identification of no ball will be identified by detecting the "line" of bowler crease by the umpire bot master and slave by which it compares different images captured by the electronic camera unit which has AI module 115 running into it.
4. The umpire bot 50 declares 'BYE' on the display panels (master & slave) thereby making the decision both visible and verbal.

The next working embodiment depicts the umpire bot 50 performing thorough and continuous logical review of the checklist for all cricket rules, while making umpiring decisions for a LEG-BYE. The umpire bot 50 performs real time monitoring and capturing all movements—bowler, batsman, wicketkeeper actions, fielder positions, equipment monitoring, pitch and crease. Further, the system performs the following for Run-out decision checklist:

1. Valid ball by the bowler
2. A "Leg Bye" is where runs are scored by hitting the batsman, but not the bat, and the ball is not a no ball or a wide. However, no runs can be scored if the striking batsman does not attempt to play a shot or if he was avoiding the ball.
3. Identification of no ball will be identified by detecting the "line" of bowler crease by the umpire bot (master and slave), by which it compares different images captured by the camera embedded with an AI module 115.
4. The umpire bot 50 declares 'LEG-BYE' on the display interface 70 (master & slave) thereby making the decision both visible and verbal.

The next aspect of present disclosure discusses umpire bot 50 (master & slave) performing a thorough and continuous logical review of the checklist for all cricket rules, when the umpiring decision for bowled batsman is to be made. Here, again the umpire bot 50 performs real time monitoring and capturing all movements—bowler, batsman, wicketkeeper actions, fielder positions, equipment monitoring, pitch and crease. Further, the system 100 does the following for decision checklist:

1. Valid ball by the bowler
2. Umpire bot 50 checks even if at least one bail is displaced or dislodged by the ball. It does not matter whether the ball has touched the batsman's bat, gloves, body or any other part of the batsman. However, the ball is not allowed to have touched another player before hitting the wickets.
3. Identification of bowled will be made by detecting the bail getting dismantled by the master and slave umpire bot, based on the comparison it does from different images taken by the camera embedded with an AI module 115.
4. The umpire bot declares 'BOWLED' on the display panels (master & slave), making the decision both visible and verbal.

One other embodiment shows umpire bot 50 (master & slave) performing thorough and continuous logical review of the checklist for all cricket rules, while making umpiring decisions for caught. The umpire bot 50 performs real time monitoring and capturing all movements—bowler, batsman, wicketkeeper actions, fielder positions, equipment monitoring, pitch and crease. Further, the system 100 performs the following for run-out decision checklist:
1. Valid ball by the bowler
2. Umpire bot 50 checks if the batsman hits the ball or touches the ball at all with his bat or hand/dove holding the bat, then the batsman can be declared catch out. This is done by the fielders, wicket keeper or bowler catching the ball on the full (before it bounces/pitch).
3. A catch will be determined based on collision that happened between bat, glove & forehand.
4. The umpire bot 50 will detect the collision based on depth information that is captured between any of these combination bat & ball, glove & ball, forehand & ball.
5. The umpire bot 50 declares 'CAUGHT' on the display panels (master & slave), making the decision both visible and verbal.

In another working embodiment, the umpire bot 50 does thorough and continuous logical review of the checklist for all cricket rules, while making umpiring decision for HIT wicket. The umpire bot 50 performs real time monitoring and capturing all movements—bowler, batsman, wicketkeeper actions, fielder positions, equipment monitoring, pitch and crease. Next, the system 100 does the following for Run-out decision checklist:
1. Valid ball by the bowler
2. Umpire bot checks if the batsman hits his wicket down with his bat or body after the bowler has entered his delivery stride. If the ball is in play, the batsman is declared out. The striking batsman is also considered out if he hits his wicket down while setting off for his first run.
3. Identification of "Hit Wicket" by umpire bot 50 will happen by checking the frames. During frame analysis, if there is a collision happened between the bat and wicket it will be considered as "hit wicket". This will happen based on situation mentioned in point 2.
4. The umpire bot 50 declares 'HIT WICKET' on the display interface 70 (master & slave making the decision both visible and verbal.

One other working embodiment presents umpire bot 50 (master & slave) that performs thorough and continuous logical review of the checklist for all cricket rules, while making umpiring decisions for a handling the ball. The umpire bot 50 does real time monitoring and capturing all movements—bowler, batsman, wicketkeeper actions, fielder positions, equipment monitoring, pitch and crease. Further, the system 100 does the following for Run-out decision checklist:
1. Valid ball by the bowler
2. Umpire bot checks if the batsman should be given out if he willingly handles the ball with the hand that is not touching the bat without the consent of the opposition.
3. Identification of handling the ball is determined by umpire bot 50. This will happen by checking the frames. During frame analysis, if there is a collision happened between the hand and ball it will be considered at "handling the ball" only based on situation mentioned in point 2.
4. The umpire bot 50 declares OUT 'HANDLED THE BALL' on the display panels (master & slave), making the decision both visible and verbal.

In next working embodiment, the umpire bot 50 (master & slave) does thorough and continuous logical review of the checklist for all cricket rules, while making umpiring decisions for time out. The umpire bot 50 does real time monitoring and capturing all movements—bowler, batsman, wicketkeeper actions, fielder positions, equipment monitoring, pitch and crease. Further, the system 100 does the following for Run-out decision checklist:
1. Valid ball by the bowler
2. Umpire bot 50 checks and monitors timing that the incoming batsman must be ready to face a ball or be at the non-strikers end with his partner within three minutes of the outgoing batsman being dismissed. If this is not done the incoming batsman is given out.
3. Identification of timeout will happen based on validating the time of entry of new batsman into the field with respect to the dismissed batsman who gets exit of the boundary area. If there is a time gap between these two frames, more than 3 min then it will be considered as out.
4. The umpire bot 50 declares 'TIMED OUT' on the display panels (master & slave), making decision both visible and verbal.

In one other aspect of present disclosure, the umpire bot 50 (master & slave) performs thorough and continuous logical review of the checklist for all cricket rules, while making umpiring decisions for HIT THE BALL TWICE. The umpire bot 50 performs real time monitoring and capturing all movements—bowler, batsman, wicketkeeper actions, fielder positions, equipment monitoring, pitch and crease. Further, the system does the following for Run-out decision checklist:
1. Valid ball by the bowler
2. Umpire bot 50 checks if a batsman hits a ball twice other than for the purpose of protecting his wicket or with consent from the opposition he is out.
3. Identification of "hit the ball twice" will happen based on validating whether collision between the bat and ball happen twice. If a data in sequence of frames identified the collision, then the decision will be OUT.
4. The umpire bot 50 declares OUT 'HIT THE BALL TWICE' on the display interface 70 (master & slave), making the decision visible and verbal.

In next working embodiment, the umpire bot 50 (master & slave) performs thorough and continuous logical review of the checklist for all cricket rules, while making umpiring decisions for obstructing the field. The umpire bot 50 does real time monitoring and capturing all movements—bowler, batsman, wicketkeeper actions, fielder positions, equipment monitoring, pitch and crease. Further, the system 100 does the following for Run-out decision checklist:
1. Valid ball by the bowler
2. Umpire bot 50 analyses the batsman is out if he willingly Obstructs the opposition by word or action.
3. Identification of "obstructing the field" will happen based on validating whether there is a collision between the batsman and fielding player as explained in point 2. In this situation, the decision will be given as OUT.
4. The umpire bot 50 declares out 'OBSTRUCTING THE FIELD' on the display interface 70 (piaster & slave), making the decision both visible and verbal.

The foregoing description is a specific embodiment of the present disclosure. It should be appreciated that this embodiment is described for purpose of illustration only, and that those skilled in the art may practice numerous alterations and modifications without departing from the spirit and scope of the invention. It is intended that all such modifications and alterations be included in so far as they come within the scope of the invention as claimed or the equivalents thereof.

The invention claimed is:

1. A cricket umpiring system (100), comprising:
an artificial intelligence (AI) module (115) that trains the system (100), performs analysis based on player profile, assesses contextual information, and facilitates real time decision making during playtime based on the analysis of the player profile and the assessment of the contextual information;
a display interface (70) that is configured to display an umpiring decision and perform autoscoring of a game;
at least a pair of umpire bots (50 a, 50 d) placed at bowler's end; and
at least a pair of umpire bots (50 b, 50 c) placed at striker's end,
wherein each pair of umpire bots are configured with a telescopic functionality;
wherein, during a first over of play, an umpire bot (50 a) placed at the bowler's end is configured as a master and configured to make umpiring and scoring decisions and an umpire bot (50 d) placed at the bowler's end and the pair of umpire bots (50 b, 50 c) placed at the striker's end are configured as slaves; and
wherein, during the first over of play, umpire bots (50 a, 50 b) placed at the bowler's end and the striker's end, respectively, are configured to be fully extended via the telescopic functionality; and umpire bots (50 d, 50 c) placed at the bowler's end and the striker's end, respectively, are configured to be fully retracted into a play area.

2. The cricket umpiring system (100) as claimed in accordance with claim 1, wherein the pair of umpire bots (50 a, 50 d) are placed behind bowler's end stumps and square leg side of bowler's end stumps, respectively and the pair of umpire bots (50 b, 50 c) are placed on square legs side of striker's end stump and behind the striker's end stump, respectively.

3. The cricket umpiring system (100) as claimed in accordance with claim 1, wherein, the umpire bots (50 a, 50 c) placed at the bowler's end stumps and the striker's end stumps, respectively, alternate from master to slave roles while the umpire bots (50 b, 50 d) placed at the striker's end and at the bowler's end, respectively, continue to assume slave roles throughout the game; and an assigned master umpire bot at the bowler's end and a corresponding slave umpire bot at the striker's end are configured to be fully extended, while remaining slave umpire bots' are configured to be fully retracted.

4. The cricket umpiring system (100) as claimed in accordance with claim 1, wherein each pair of umpire bots is configured with a telescopic pole (62) for providing telescopic functionality, a robotic arm (71), and a movable leg (72) to communicate the umpiring and scoring decisions.

5. The cricket umpiring system (100) as claimed in accordance with claim 4, wherein each pair of umpire bots is configured to predict ball trajectory and enable tilting towards a secure position via the telescopic pole (62) to avoid collision with a ball.

6. The cricket umpiring system (100) as claimed in accordance with claim 1, further comprising an electronic camera unit (60) provided with an inbuilt battery, wherein the inbuilt battery is charged via adapters or via use of solar energy.

7. The cricket umpiring system (100) as claimed in accordance with claim 1, further comprising of an image detection module (105) that is configured to capture images in real time during the play and store the images in a database (103) for consequent decision making.

8. The cricket umpiring system (100) as claimed in accordance with claim 6, further comprising of a 360 degree camera provided with a USB-2 type interface and is detachable to operate as an independent camera unit connected with the electronic camera unit (60) for 360 degree video recording of playground.

* * * * *